(12) United States Patent
Onishi

(10) Patent No.: US 10,128,873 B2
(45) Date of Patent: Nov. 13, 2018

(54) CONTROL DEVICE, ELECTRONIC APPARATUS, AND CONTACTLESS POWER TRANSMISSION SYSTEM

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 93 days.

(21) Appl. No.: 15/148,227

(22) Filed: May 6, 2016

(65) Prior Publication Data
US 2016/0336976 A1 Nov. 17, 2016

(30) Foreign Application Priority Data

May 13, 2015 (JP) .................................. 2015-098043

(51) Int. Cl.
| | |
|---|---|
| *H04B 1/04* | (2006.01) |
| *H04B 5/00* | (2006.01) |
| *H02J 5/00* | (2016.01) |
| *H02J 7/02* | (2016.01) |
| *H02J 50/10* | (2016.01) |

(52) U.S. Cl.
CPC ............ *H04B 1/0475* (2013.01); *H02J 50/10* (2016.02); *H04B 5/0037* (2013.01); *H04B 5/0031* (2013.01); *H04B 5/0075* (2013.01)

(58) Field of Classification Search
CPC .. H04B 1/0475; H04B 5/0037; H04B 5/0031; H04B 5/0075; H04B 1/04; H04B 5/00; H02J 50/10; H02J 5/005; H02J 7/025; H02J 17/00
See application file for complete search history.

(56) References Cited

U.S. PATENT DOCUMENTS

| 7,756,223 | B2 * | 7/2010 | Missoni | ............ G06K 19/0723 |
| | | | | 375/316 |
| 8,064,825 | B2 * | 11/2011 | Onishi | ................. H04B 1/3883 |
| | | | | 327/33 |
| 8,179,089 | B2 | 5/2012 | Shiozaki et al. | |
| 9,419,470 | B2 * | 8/2016 | Von Novak, III | ...... H02J 7/025 |
| 9,479,013 | B2 * | 10/2016 | Joye | ........................ H02J 5/005 |
| 9,712,001 | B2 * | 7/2017 | Nakano | .................... H02J 50/12 |
| 9,762,130 | B2 * | 9/2017 | Kawashima | ............ H02M 1/44 |
| 2009/0079271 | A1 * | 3/2009 | Jin | ........................... H02J 5/005 |
| | | | | 307/104 |
| 2013/0026849 | A1 | 1/2013 | Ohta et al. | |
| 2016/0285311 | A1 * | 9/2016 | Masumoto | .............. H02J 50/10 |

FOREIGN PATENT DOCUMENTS

| JP | 2009-303294 A | 12/2009 |
| JP | 2010-284058 A | 12/2010 |
| JP | 2011-211780 A | 10/2011 |
| JP | 2012-060730 A | 3/2012 |

* cited by examiner

*Primary Examiner* — Pablo Tran
(74) *Attorney, Agent, or Firm* — Oliff PLC

(57) ABSTRACT

A transmitting side control device includes a communication portion that performs communication processing with a power receiving device. The communication portion detects communication data from the power receiving device based on an output of a bandpass filtering portion that performs bandpass filtering processing in which a signal in a load modulation frequency band is allowed to pass and signals in bands other than the load modulation frequency band are attenuated.

15 Claims, 19 Drawing Sheets

| 16bit | 16bit | 16bit | 16bit |
|---|---|---|---|
| 00h | (1) DATA CODE + RECTIFICATION VOLTAGE | (2)(3)(4)(5)(6)(7) | (8)CRC |

FIG. 13A

| | bit15 ··· bit0 |
|---|---|
| (1) | DATA CODE \| RECTIFICATION VOLTAGE |
| (2) | TEMPERATURE |
| (3) | CHARGE VOLTAGE |
| (4) | CHARGE CURRENT |
| (5) | STATUS FLAG |
| (6) | NUMBER OF CYCLES |
| (7) | IC NUMBER |
| (8) | CRC |

FIG. 13B

CONTROL DEVICE, ELECTRONIC APPARATUS, AND CONTACTLESS POWER TRANSMISSION SYSTEM

BACKGROUND

1. Technical Field

The present invention relates to a control device, an electronic apparatus, a contactless power transmission system, and the like.

2. Related Art

In recent years, much attention has been paid to contactless power transmission (wireless power transfer) in which electromagnetic induction is used to make power transmission possible without metal contact. Charging of electronic apparatuses such as a household appliance and a mobile terminal has been proposed as an application example of contactless power transmission.

Known technologies for contactless power transmission are disclosed in JP-A-2009-303294, JP-A-2010-284058, JP-A-2011-211780, and JP-A-2012-60730. In these known technologies, data is transmitted from a power receiving side (secondary side) to a power transmitting side (primary side) using load modulation, and various types of information on the power receiving side is transmitted to the power transmitting side.

In the conventional technologies described in JP-A-2009-303294 and the like, the power receiving side transmits communication data by load modulation, and the power transmitting side monitors the coil end voltage of the primary coil or the like, and detects the communication data by detecting the phase the a waveform of the voltage across the coil on the primary side.

However, in the conventional technologies, there is a concern that a communication data detection error may occur in a situation where there is much noise superimposed on the signal, for example. Also, in the conventional technologies, the power receiving side performs the load modulation in a communication period in a state in which charging is stopped or the charge current is reduced, and continuous load modulation in a normal power transmission period cannot be realized.

SUMMARY

According to some aspects of the invention, a control device, an electronic apparatus, a contactless power transmission system, and the like can be provided in which noise immunity or the like with respect to detection of a load change by load modulation can be improved.

One aspect of the invention relates to a control device on a transmitting side in a contactless power transmission system including a power transmitting device and a power receiving device. The control device includes: a driver control circuit that controls a power transmission driver in a power transmission portion that transmits power to the power receiving device; a control portion that controls the driver control circuit; and a communication portion that performs communication processing with the power receiving device that transmits communication data by load modulation. The communication portion detects the communication data from the power receiving device based on an output of a bandpass filter portion that performs bandpass filtering processing in which a signal in a load modulation frequency band is allowed to pass and a signal in a band other than the load modulation frequency band is attenuated.

According to the one aspect of the invention, power is transmitted to the power receiving device, and communication processing is performed with the power receiving device by load modulation. In the aspect of the invention, the communication data from the power receiving device is detected based on an output of the bandpass filter portion that performs bandpass filtering processing. As a result of performing bandpass filtering processing when a load change by load modulation is to be detected, the communication data can be detected by targeting a signal in the load modulation frequency band and attenuating signals in frequency bands other than the load modulation frequency band. Accordingly, noise immunity in detecting a load change by load modulation can be improved, and appropriate communication processing with a power receiving side can be realized.

Also, in the one aspect of the invention, the bandpass filter portion may perform the bandpass filtering processing in which a signal in at least one of a drive frequency band of the power transmission portion and a DC band is attenuated.

By attenuating a signal in a band of the drive frequency of the power transmission portion in this way, a drive frequency noise component that is superimposed on the detection target signal can be reduced, and therefore noise immunity in detection can be improved. Also, by attenuating a DC band signal, subsequent signal processing can be performed after a DC component is removed from the detection target signal, and thereby preferable signal processing can be realized.

Also, in the one aspect of the invention, the communication portion may include a current detection circuit that detects a current that flows from a power supply to the power transmission portion, and outputs a detection voltage to the bandpass filter portion.

In this way, bandpass filtering processing is performed on a detection voltage signal that is obtained based on a current that flows from the power supply to the power transmission portion, and thereby noise that is superimposed on the signal can be reduced.

Also, in the one aspect of the invention, the communication portion may include a comparator circuit that compares the detection voltage that has been subjected to the bandpass filtering processing by the bandpass filter portion with a judgement voltage, and detect the communication data based on a comparison result of the comparator circuit.

In this way, the detection voltage signal from which noise that is superimposed thereon is reduced by bandpass filtering processing is input to the comparator circuit, and is compared with the judgement voltage. Accordingly, an adverse effect of the noise on a comparison judgement result of the comparator circuit can be reduced, and improvement in noise immunity or the like can be realized.

Also, in the one aspect of the invention, the comparator circuit may be a circuit that can compare the detection voltage that has been subjected to the bandpass filtering processing by the bandpass filter portion with two or more judgement voltages.

In this way, the judgement voltage can be set so as to improve detection sensitivity or noise immunity.

Also, in the one aspect of the invention, the control device may further include a filter portion provided downstream of the comparator circuit. The communication portion may detect the communication data based on the comparison result that has been subjected to filtering processing by the filter portion.

In this way, an adverse effect of noise that is superimposed on the comparison result signal is reduced by filtering processing in the filter portion, and the communication data can be detected based on the comparison result after filtering processing, and therefore improvement in noise immunity or the like can be realized.

Also, in the one aspect of the invention, the power transmission portion may include a power transmission driver and a power supply voltage control portion that controls a power supply voltage of the power transmission driver, and the control portion may control the power supply voltage control portion based on the communication data from the power receiving device.

In this way, the power supply voltage that is supplied to the power transmission driver or the like can be controlled based on the communication data from the power receiving device, and thereby appropriate power control, safe power control, and the like can be realized.

Also, in the one aspect of the invention, the communication portion may include a current detection circuit that detects a current that flows from a power supply to the power transmission portion, and the current detection circuit may detect a current that flows from the power supply to the power transmission portion via the power supply voltage control portion, and outputs a detection voltage to the bandpass filter portion.

In this way, noise immunity in detecting a load change by load modulation can be improved while realizing appropriate power control, safe power control, and the like.

Also, in the one aspect of the invention, the communication portion may determine that the communication data is in a first logic level in a case where a load modulation pattern that is constituted by a first load state and a second load state is a first pattern, and determine that the communication data is in a second logic level in a case where the load modulation pattern is a second pattern that is different from the first pattern.

In this way, sensitivity and noise immunity in detecting a load change by load modulation can be improved compared with a method in which a first load state by load modulation is determined to be a first logic level and a second load state is determined to be a second logic level, and appropriate communication processing with the power receiving side can be realized.

Also, in the one aspect of the invention, the first pattern may be a pattern in which a period width of the first load state is longer than that in the second pattern.

In this way, by identifying the period width of a first load state, for example, the load modulation pattern can be determined to be either the first pattern or the second pattern, and thereby sensitivity and noise immunity in detection can be improved.

Also, in the one aspect of the invention, the communication portion may take in the communication data having a given number of bits by performing sampling on a load modulation pattern at given sampling intervals from a first sampling point that is set within a period of the first load state in the first pattern.

In this way, communication data of a given number of bits can be taken in by setting sampling points after the first sampling point by simple processing, and simplification of a detection operation for detecting communication data, reduction of processing load, and the like can be realized.

Also, in the one aspect of the invention, the communication portion may set the first sampling point within a period of the first load state in a case where a period width of the first load state is less than a first range width.

In this way, in a case where the width of the first load state period changes due to noise or the like as well, the first sampling point appropriate for sampling of the communication data can be set.

Another aspect of the invention relates to an electronic apparatus including the control device according to any of the above descriptions.

Another aspect of the invention relates to a contactless power transmission system including a power transmitting device and a power receiving device. The power transmitting device transmits power to the power receiving device, and performs communication processing with the power receiving device that transmits communication data by load modulation. The power receiving device receives power from the power transmitting device, and transmits the communication data to the power transmitting device by performing the load modulation. The power transmitting device detects the communication data from the power receiving device based on an output of a bandpass filter portion that performs bandpass filtering processing in which a signal in a load modulation frequency band is allowed to pass and a signal in a band other than the load modulation frequency band is attenuated.

According to the other aspects of the invention, the power receiving device transmits communication data by load modulation, and the power transmitting device performs a detection operation for detecting the communication data that is transmitted by load modulation. Here, the communication data from the power receiving device is detected based on the output of the bandpass filter portion that performs bandpass filtering processing. As a result of performing bandpass filtering processing when a load change by load modulation is to be detected, the communication data can be detected by targeting a signal in the load modulation frequency band and attenuating signals in frequency bands other than the load modulation frequency band. Accordingly, noise immunity in detecting a load change by load modulation can be improved, and appropriate communication processing with the power receiving side can be realized.

BRIEF DESCRIPTION OF THE DRAWINGS

The invention will be described with reference to the accompanying drawings, wherein like numbers reference like elements.

FIGS. 13A and 13B are examples of a format of communication data.

DESCRIPTION OF EXEMPLARY EMBODIMENTS

Hereinafter, a preferable embodiment of the invention will be described in detail. Note that the embodiment described below is not intended to unduly limit the content of the invention described in the scope of claims, and not all configurations described in this embodiment are necessarily essential as solving means of the invention.

1. Electronic Apparatus

Figure 1:
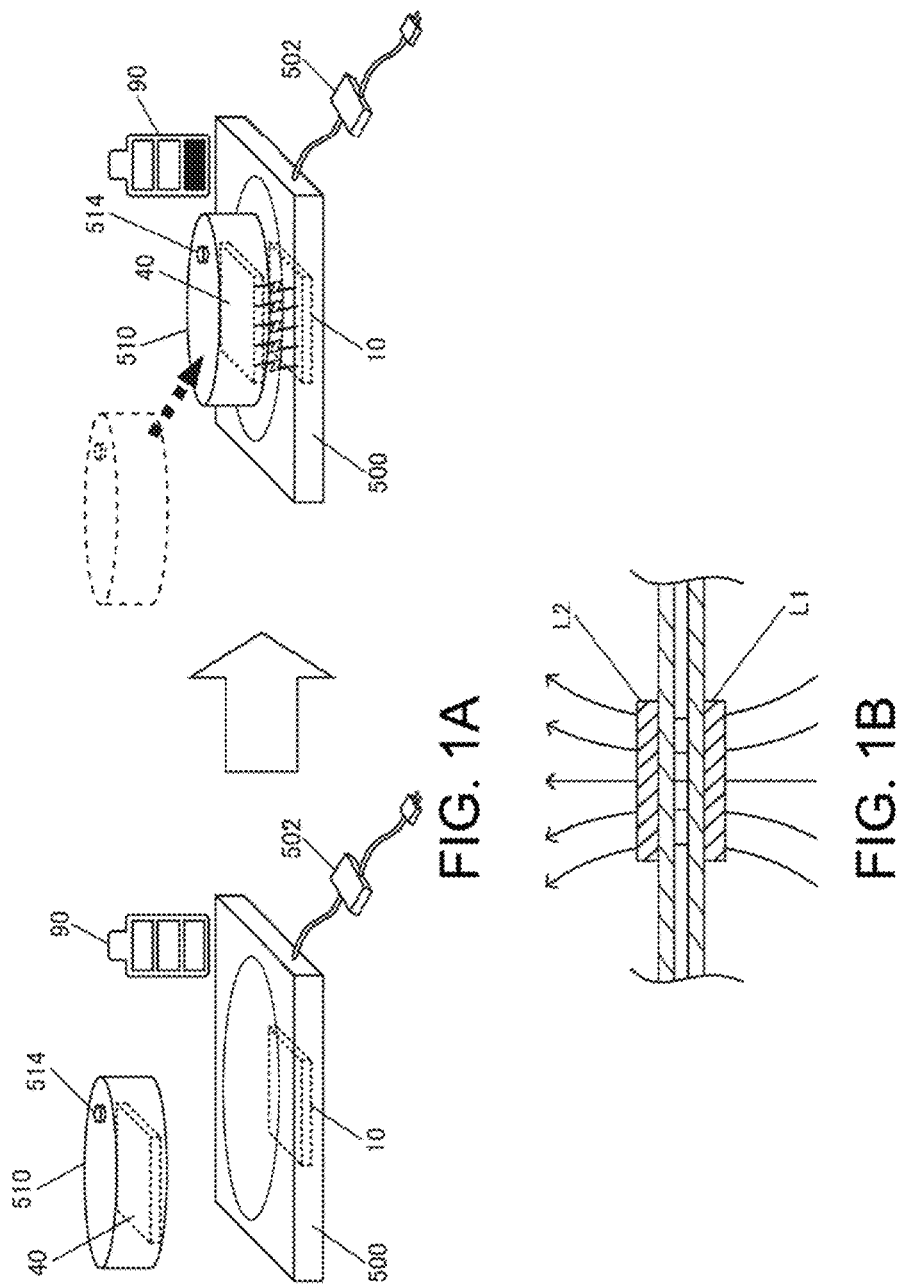
FIGS. 1A and 1B are diagrams for describing a contactless power transmission system of a present embodiment.

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 and a battery 90. Note that, although the battery 90 is schematically illustrated in FIG. 1A, the battery 90 is in actuality incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a SUB (SUB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus), a mobile information terminal (such as a smart phone or a cellular phone), a cord less telephone, a shaver, an electric toothbrush, a wrist computer, a handy terminal, an electric car, and an electric bicycle.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible.

Figure 2:
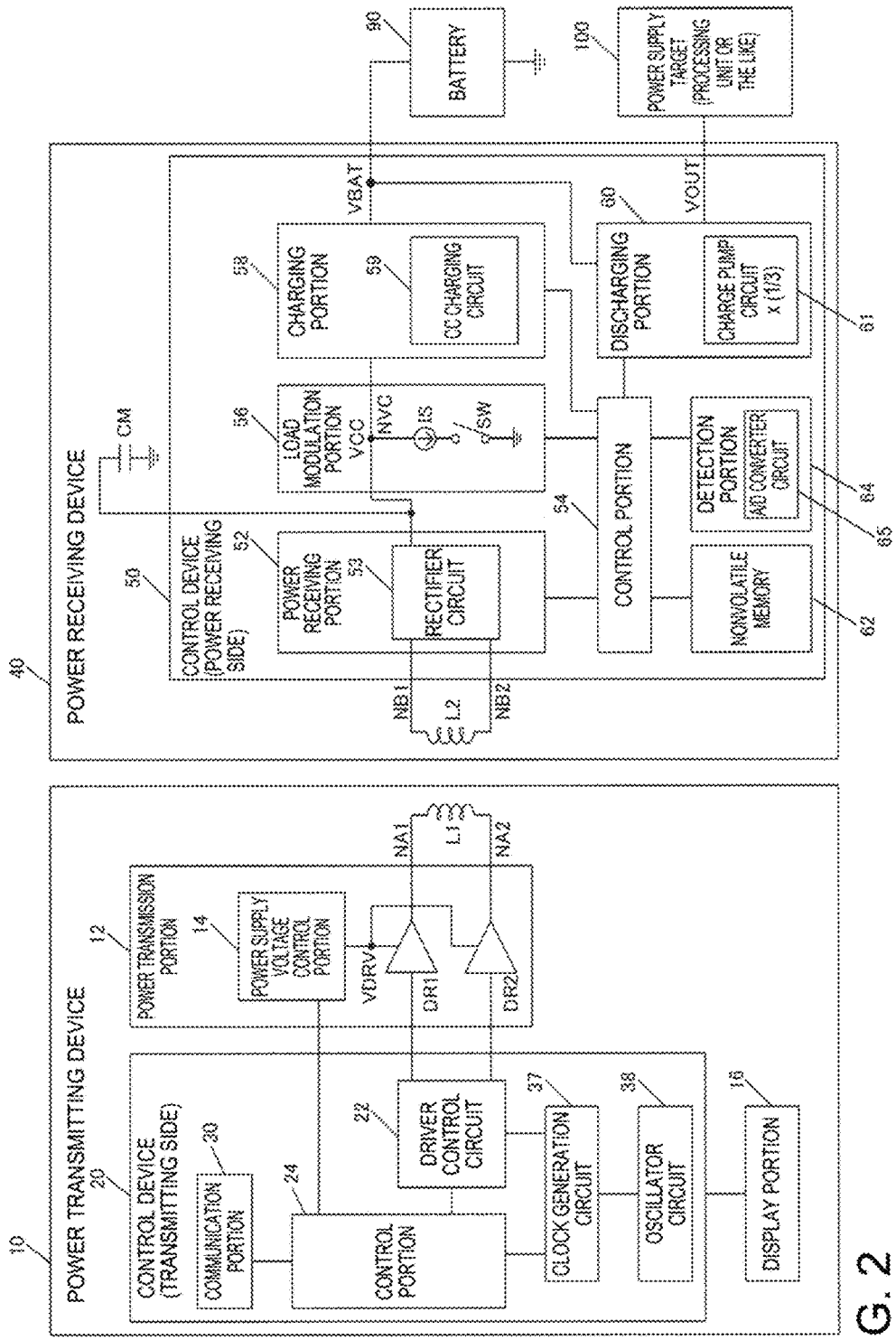
FIG. 2 illustrates an exemplary configuration of a power transmitting device, a power receiving device, and control devices on a power transmitting side and a power receiving side of the present embodiment.

2. Power Transmitting Device, Power Receiving Device, Control Devices on Power Transmitting Side and Receiving Side An exemplary configuration of the power transmitting device 10, the power receiving device 40, a transmitting side control device 20, and a receiving side control device 50 of the present embodiment is shown in FIG. 2. An electronic apparatus on the power transmitting side such as the charger 500 in FIG. 1A includes at least the power transmitting device 10 in FIG. 2. Also, the electronic apparatus 510 on the power receiving side can include at least the power receiving device 40, the battery 90, and a power supply target 100. The power supply target 100 can be various devices such as a processing unit (such as DIP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2, and charging of the battery 90 or the like is performed.

The power transmitting device 10 (power transmission module, primary module) includes the primary coil L1, a power transmission portion 12, a display portion 16, and a control device 20. Note that the power transmitting device 10 is not limited to the configuration in FIG. 2, and various modifications can be implemented such as omitting a portion (such as the display portion, for example) of the constituent elements, adding another constituent element, or changing connection relationship.

When power is to be transmitted, the power transmission portion 12 generates an AC voltage of a predetermined frequency and supplies the voltage to the primary coil L1. The power transmission portion 12 includes a first power transmission driver DR1 that drives one end of the primary coil L1, a second power transmission driver DR2 that drives the other end of the primary coil L1, and a power supply voltage control portion 14. Also, the power transmission portion 12 can include at least one capacitor that constitutes a resonance circuit with the primary coil L1.

The power transmission drivers DR1 and DR2 in the power transmission portion 12 are each realized by an inverter circuit (buffer circuit) constituted by a power MOS transistor or the like, for example. These power transmission drivers DR1 and DR2 are controlled (driven) by a driver control circuit 22 in the control device 20.

The power supply voltage control portion 14 in the power transmission portion 12 controls a power supply voltage VDRV of the power transmission drivers DR1 and DR2 for example, a control portion 24 controls the power supply voltage control portion 14 based on communication data received from the power receiving side. Accordingly, the power supply voltage VDRV supplied to the power transmission drivers DR1 And DR2 is controlled, and variable control of the transmitting power is realized, for example. The power supply voltage control portion 14 can be realized by a DC/DC converter or the like. For example, the power supply voltage control portion 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 And DR2. Specifically, when increasing the transmitting power from the power transmitting device 10 to the power receiving device 40, the power supply voltage control portion 14 increases the power supply voltage VDRV that is supplied to the power transmission drivers DR1 and DR2, and when decreasing the transmitting power, the power supply voltage control portion 14 decreases the power supply voltage VDRV.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B. On the other hand, when power transmission is not needed, the electronic apparatus 510 is physically separated from the charger 500 so as to be in a state in which the magnetic flux of the primary coil L1 does not pass through the secondary coil L2.

The display portion 16 displays various states (such as being in power transmission or ID authentication) of the contactless power transmission system using a color, an image, or the like, and can be realized by an LED, an, LCD, or the like.

The control device 20 performs various types of control on the power transmitting side, and can be realized by an integrated circuit device (IC) or the like. The control device 20 includes the driver control circuit 22, the control portion 24, and a communication portion 30. Also, the control device 20 can include a clock generation circuit 37 and an oscillator circuit 38. Note that the control device 20 is not limited to the configuration in FIG. 2, and various modifications can be implemented such as omitting a portion (such as the clock generation circuit or the oscillator circuit) of the constituent elements, adding another constituent element, or changing connection relationships. For example, a modification in which the power transmission portion 12 or the like is incorporated in the control device 20 can be implemented.

The driver control circuit 22 controls the power transmission drivers DR1 and DR2 in the power transmission portion 12 that transmits power to the power receiving device 40. For example, the driver control circuit 22 outputs a control signal (drive signal) to gates of transistors that constitute the power transmission drivers DR1 and DR2, and causes the power transmission drivers DR1 and DR2 to drive the primary coil L1.

The control portion 24 executes various types of control processing of the transmitting side control device 20. For example, the control portion 24 controls the driver control circuit 22. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs communication processing for communication with the power receiving device 40 (control device 50) that transmits communication data by load modulation. Specifically, the communication portion 30 performs processing for detecting and receiving communication data from the power receiving device 40.

The oscillator circuit 38 is constituted by a crystal-oscillator circuit or the like, and generates a clock signal for the primary side. The clock generation circuit 37 generates a drive clock signal that defines a drive frequency, or the like. Also, the driver control circuit 22 generates a control signal having a given frequency (drive frequency) based on the drive clock signal and the control signal from the control portion 24, and outputs the control signal to the power transmission drivers DR1 and DR2 in the power transmission portion 12 for control.

The power receiving device 40 (power receiving module, secondary module) includes the secondary coil L2 and the control device 50. Note that the power receiving device 40 is not limited to the configuration in FIG. 2, and various modifications can be implemented such as omitting a portion of the constituent elements, adding another constituent element, or changing connection relationships.

The control device 50 performs various types of control on the power receiving side, and is realized by an integrated circuit device (IC) or the like. The control device 50 includes a power receiving portion 52, a control portion 54, a load modulation portion 56, a charging portion 58, and a discharging portion 60. Also, the control device 50 can include a nonvolatile memory 62 and a detection portion 64. Note that the control device 50 is not limited to the configuration in FIG. 2, and various modifications can be implemented such as omitting a portion of the constituent elements, adding another constituent element, or changing connection relationships. For example, a modification is possible in with the power receiving portion 52 or the like is provided outside the control device 50.

The power receiving portion 52 receives power from the power transmitting device 10. Specifically, the receiving portion 52 converts an AC voltage induced in the secondary coil L2 to a DC rectified voltage VCC, and outputs the rectified voltage VCC. This conversion is performed by a rectifier circuit 53 included in the power receiving portion 52. The rectifier circuit 53 can be realized by a plurality of transistors, diodes, and the like.

The control portion 54 performs various types of control processing on the receiving side control device 50. For example, the control portion 54 controls a load modulation portion 56, a charging portion 58, and a discharging portion 60. Also, the control portion 54 can control the power receiving portion 52, the nonvolatile memory 62, the detection portion 64, and the like. The control portion 54 can be realized by a logic circuit such as a gate array that is generated by an automated place-and-route method, or various processors such as a microcomputer, for example.

The load modulation portion 56 performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control portion 54, for example, and a current (constant current) of the current source IS that flows from the node NVC to GND is caused to flow or cut off, and thereby the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 2, and various modifications such as using a resistor in place of the current source IS can be implemented.

The charging portion 58 performs charging (charging control) of the battery 90. For example, the charging portion 58 charges the battery 90 based on the power received by the power receiving portion 52 that receives power from the power transmitting device 10. For example, the charging portion 58 is supplied with a voltage that is based on the rectified voltage VCC (DC voltage, in a broad sense) from the power receiving portion 52, and charges the battery 90. The charging portion 58 may include a CC charging circuit 59. The CC charging circuit 59 is a circuit that performs CC (Constant-Current) charging of the battery 90.

The discharging portion 60 performs a discharging operation for discharging the battery 90. For example, the discharging portion 60 (power supply portion) performs the discharging operation for discharging the battery 90, and supplies power from the battery 90 to a power supply target 100. For example, the discharging portion 60 is supplied with a charge voltage (battery voltage) VBAT from the battery 90, and supplies an output voltage VOUT to the power supply target 100. The discharging portion 60 can include a charge pump circuit 61. The charge pump circuit 61 steps down the charge voltage VBAT (to a third of the input voltage, for example), and supplies the stepped down voltage to the power supply target 100 as the output voltage VOUT (VBAT/3). The discharging portion 60 (charge pump circuit) operates with the charge voltage VBAT as the power supply voltage.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DIP, microcomputer) that is provided in the electronic apparatus 510 (FIG. 1A) in which the power receiving device 40 is incorporated, and is a power supply target of the battery 90.

The nonvolatile memory 62 is a nonvolatile memory device that stores various types of information. The nonvolatile memory 62 stores various types of information such as status information of the power receiving device 40 (control device 50), for example. An EEPROM or the like can be used as the nonvolatile memory 62. MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the charge voltage VBAT, and the like. Specifically, the detection portion 64 includes an A/D converter circuit 65, performs A/D conversion on voltages based on the rectified voltage VCC and the charge voltage VBAT, a temperature detection voltage from an unshown temperature detection portion, and the like with the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64. For example, over-voltage protection, high temperature protection, and low temperature protection can be realized by the detection portion 64 detecting over-voltage and abnormal temperature during the charging. Also, over-discharge protection and over-current protection can be realized by the detection portion 64 detecting over-discharge and over-current during the discharging.

3. Outline of Operation Sequence of Contactless Power Transmission System

Next, an example of an outline of operation sequence of the contactless power transmission system of the present embodiment will be described with reference to FIG. 3.

Figure 3:
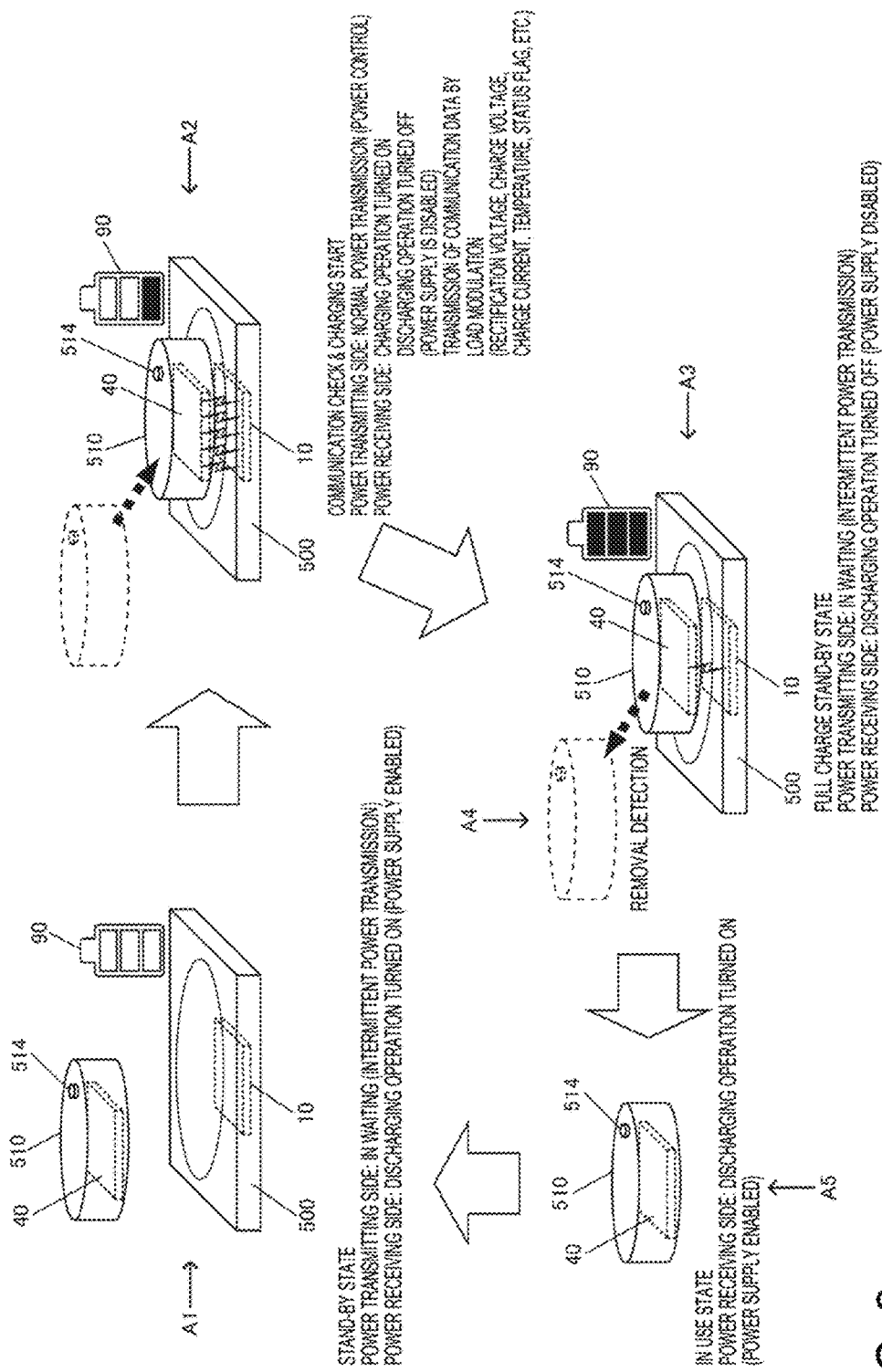
FIG. 3 is a diagram for describing an outline of an operation sequence of the contactless power transmission system of the present embodiment.

In A1 in FIG. 3, the electronic apparatus 510 including the power receiving device 40 is not placed on the charger 500 including the power transmitting device 10, and is in a removed state. In this case, a stand-by state is realized. In the stand-by state, the power transmitting side is in a waiting state, and the power receiving side is in a state where the discharging operation is turned on.

Specifically, in the stand-by state, the power transmission portion 12 of the power transmitting device 10 performs intermittent power transmission for landing detection. That is, the power transmission portion 12 is in a state in which continuous power transmission such as normal power transmission is not performed, and intermittent power transmission in which power is intermittently transmitted in given intervals is performed so as to detect landing of the electronic apparatus 510. Also, in the stand-by state, the operation for discharge to the power supply target 100 is turned on in the power receiving device 40, and power supply to the power supply target 100 is enabled. That is, the discharging portion 60 in the power receiving device 40 performs an operation of discharging the power from the battery 90 to the power supply target 100. Accordingly, the power supply target 100 such as a processing unit is supplied with the power from the battery 90, and can operate.

As shown in A2 in FIG. 3, when the electronic apparatus 510 is placed on the charger 500, and landing is detected, a communication check & charge state is realized. In the communication check & charge state, normal power transmission is performed on the power transmitting side, and the charging operation is turned on and the discharging operation is turned off on the power receiving side. Also, transmission of the communication data by load modulation is performed on the power receiving side.

Specifically, in the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC which is the output voltage from the power receiving portion 52. The charge state of the battery 90 can be determined based on the information such as the charge voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including power transmission status information (such as VCC), charge status information (such as VBAT and various status flags), and information such as a temperature is transmitted from the power receiving side to the power transmitting side by regular load modulation in a normal power transmission period. For example, power control by the power supply voltage control portion 14 in the power transmission portion 12 is performed based on the power transmission status information or the like included in the communication data.

As shown in A3 in FIG. 3, when full charge of the battery 90 is detected, a full charge stand-by state is realized. In the full charge stand-by state, the power transmitting side is in a waiting state, and the power receiving side is in a state in which the discharging operation remains off.

Specifically, the power transmission portion 12 performs intermittent power transmission for removal detection, for example. That is, the power transmission portion 12 is in a state in which continuous power transmission such as normal power transmission is not performed, and intermittent power transmission in which power is intermittently transmitted in given intervals is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 3, the electronic apparatus 510 is in a use state, and the discharging operation of the power receiving side is turned on, as shown in A5 in FIG. 3.

Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates with the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 3. Also, when landing is detected, the discharging operation of the discharging portion 60 is stopped. In this regular load modulation, communication data including information for controlling power on the power transmitting side, and information representing status on the power receiving side is transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 3. When removal is detected and a removed period begins, the discharging operation of the discharging portion 60 is performed, as shown in A4 and A5 in FIG. 3. Accordingly, power from the battery 90 is supplied to the power supply target 100, and normal operation of the electronic apparatus 510 becomes possible. Note that landing detection and removal detection are performed based on the output voltage (rectified voltage VCC, for example) of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and a normal operation of the power supply target 100 such as a processing unit (DIP) becomes possible. In this way, an operation sequence of preferable contactless power transmission can be realized in a type of electronic apparatus 510 (electronic apparatus such as a hearing aid that is worn by a user) that does not operate in the charge period during which the electronic apparatus 510 is placed on the charger 500, for example. That is, energy saving can be realized in such a type of electronic apparatus 510 as a result of the discharging operation for the discharge of power from the battery 90 being turned off in the charge period (normal power transmission period). As a result of the discharging operation being automatically turned on when removal is detected, power from the battery 90 is supplied to various devices that are power supply targets 100 of the electronic apparatus 510 so that the devices can operate, and the electronic apparatus 510 can automatically shift to a normal operation mode.

Note that FIG. 3 illustrates an example of the operation sequence of the contactless power transmission system, the operation sequence of the present embodiment is not limited to the sequence illustrated in FIG. 3, and various modifications can be implemented. Also, a detailed example of the operation sequence will be described later with reference to FIGS. 14, 15, and 16.

4. Bandpass Filter

Figure 4:
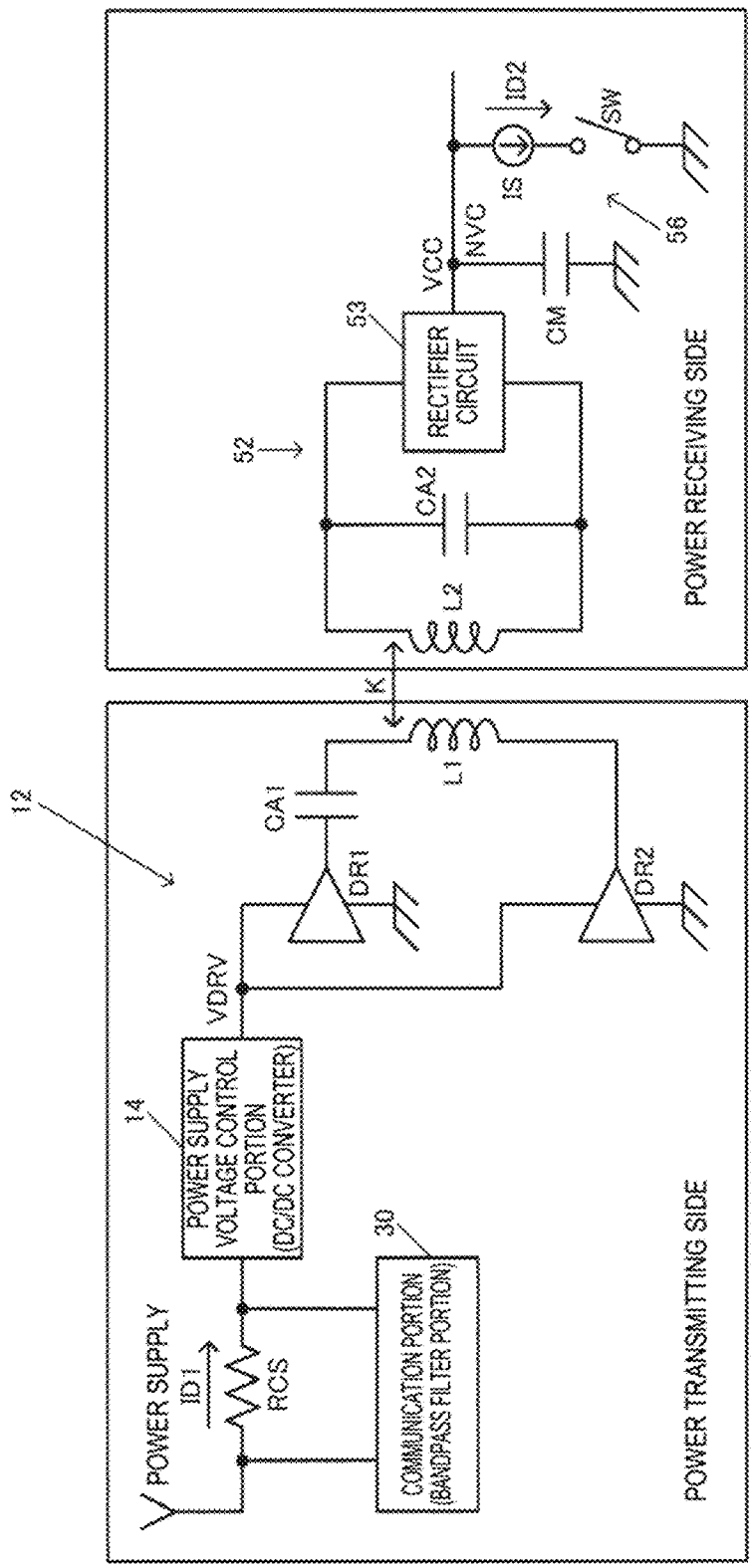
FIG. 4 is a diagram for describing a method of communication by load modulation.

FIG. 4 is a diagram for describing an example of the method of communication by load modulation. The power transmission drivers DR1 and DR2 in the power transmission portion 12 drive the primary coil L1 on the power transmitting side (primary side), as shown in FIG. 4. Specifically, the power transmission drivers DR1 and DR2 operate based on the power supply voltage VDRV supplied from the power supply voltage control portion 14 and drive the primary coil L1.

On the other hand, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and the capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control portion 14. A power supply voltage is supplied from the power supply to the power supply voltage control portion 14 via the sense resistor RCS. A current ID1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result.

In the present embodiment, the transmitting side control device 20 in the contactless power transmission system that includes the power transmitting device 10 and the power receiving device 40 includes the driver control circuit 22, the control portion 24, and the communication portion 30, as shown in FIG. 2.

The communication portion 30 in FIG. 4 detects communication data from the power receiving device 40 based on the output from a bandpass filter portion that performs bandpass filtering processing. The bandpass filter portion performs bandpass filtering processing in which a signal in a load modulation frequency band is allowed to pass, and signals in a band other than the load modulation frequency band are attenuated. Specifically, the bandpass filter portion performs bandpass filtering processing in which signals in at least one of a band including a drive frequency (FCK) of the power transmission portion 12 and a DC band, are attenuated.

Figure 5:
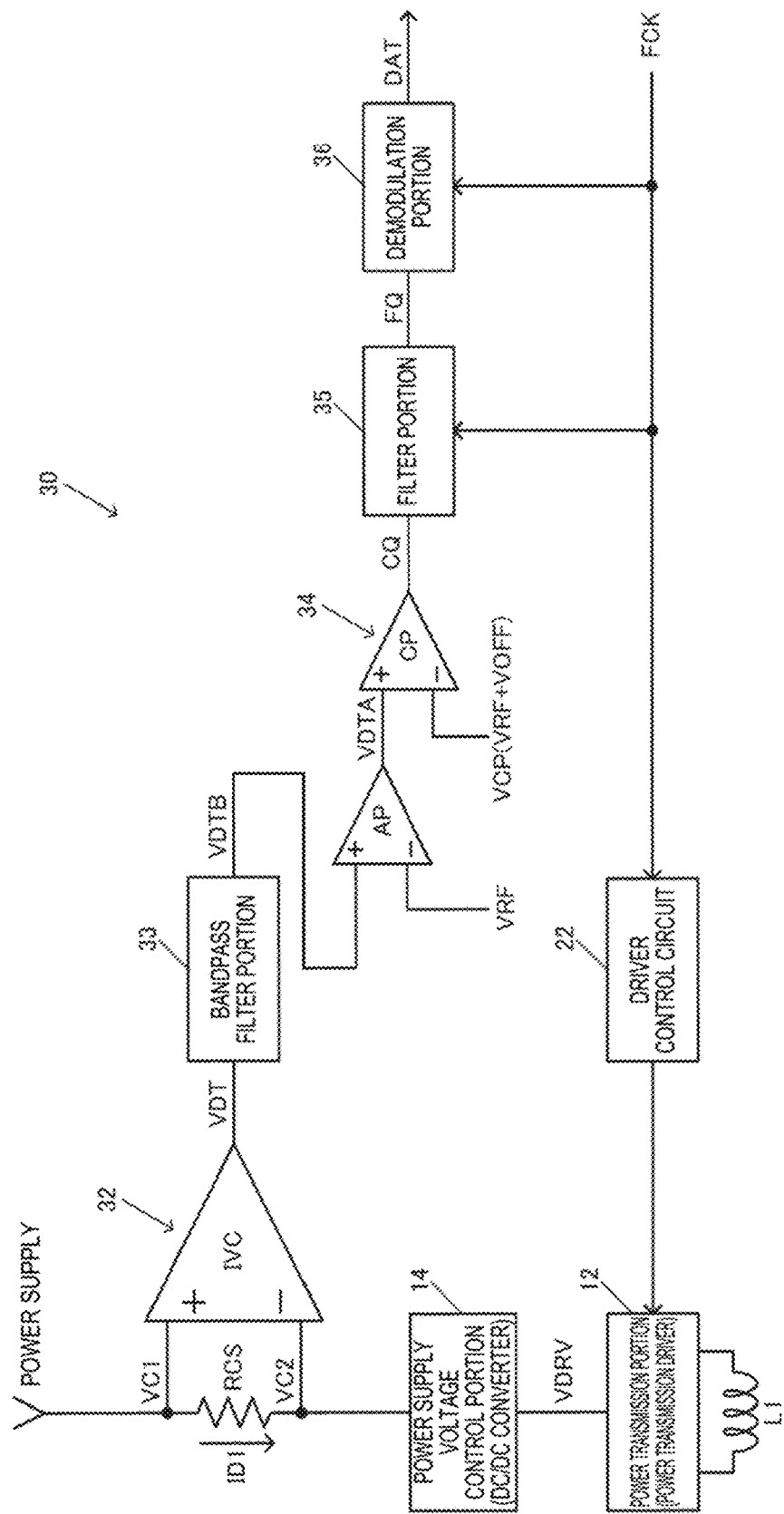
FIG. 5 illustrates an exemplary configuration of a communication portion.

An example of the specific configuration of the communication portion 30 is shown in FIG. 5. The communication portion 30 includes a current detection circuit 32, a bandpass filter portion 33, a comparator circuit 34, and a demodulation portion 36, as shown in FIG. 5. Also, the communication portion 30 can include an amplifier AP for signal amplification and a filter portion 35. Note that the communication portion 30 is not limited to the configuration in FIG. 5, and various modifications can be implemented such as omitting a portion of the constituent elements, adding another constituent element, or changing connection relationships.

The current detection circuit 32 detects the current ID1 that flows from the power supply (power supply device) to the power transmission portion 12, and outputs a detection voltage VDT to the bandpass filter portion 33. Specifically, the current detection circuit 32 detects the current ID1 that flows from the power supply to the power transmission portion 12 via the power supply voltage control portion 14, and outputs the detection voltage VDT that is a voltage converted from the current ID1 to the bandpass filter portion 33. The current ID1 may include a current that flows in the driver control circuit 22 and the like, for example.

In FIG. 5, the current detection circuit 32 is constituted by an IV conversion amplifier IVC. A non-inverting input terminal (+) of the IV conversion amplifier IVC is connected to one end of the sense resistor RCS, and an inverting input terminal (−) thereof is connected to the other end of the sense resistor RCS. The IV conversion amplifier IVC amplifies a minute voltage VC1-VC2 that is generated by the minute current ID1 that flows in the sense resistor RCS, and outputs the amplified voltage as the detection voltage VDT.

The detection voltage VDT from the current detection circuit 32 is input to the bandpass filter portion 33. The bandpass filter portion 33 performs bandpass filtering processing on the detection voltage VDT signal. Specifically, the bandpass filter portion 33 performs bandpass filtering processing in which a signal in a load modulation frequency band is allowed to pass, and signals in bands other than the load modulation frequency band (a drive frequency band and a DC band, for example) are attenuated. The bandpass filter portion 33 outputs a detection voltage VDTB resulting from bandpass filtering processing to a downstream circuit.

A comparator circuit 34 compares the detection voltage resulting from the bandpass filtering processing by the bandpass filter portion 33 with a judgement voltage. Specifically, the detection voltage VDTB from the bandpass filter portion 33 is further amplified by the amplifier AP, and the amplified voltage is output to the comparator circuit 34 as a detection voltage VDTA. For example, the detection voltage VDTB is input to a non-inverting input terminal of the amplifier AP, and a reference voltage VRF is input to an inverting input terminal thereof, and the amplifier AP outputs the detection voltage VDTA signal that has been amplified with reference to the reference voltage VRF. The comparator circuit 34 compares the detection voltage VDTA (the detection voltage resulting from bandpass filtering processing) with a judgement voltage VCP=VRF+VOFF. Then, the comparator circuit 34 outputs a comparison result CQ. For example, the comparator circuit 34 performs comparison to judge whether the detection voltage VDTA exceeds the judgement voltage VCP or is lower than the judgement voltage VCP. The comparator circuit 34 can be constituted by a comparator CP, for example. In this case, the voltage VOFF of the judgement voltage VCP=VRF+VOFF may be realized by an offset voltage of the comparator CP, or the like.

The demodulation portion 36 determines a load modulation pattern based on the comparison result CQ (comparison result FQ after filtering processing) of the comparator circuit 34. That is, communication data is detected by performing demodulation processing with the load modulation pattern, and is output as detection data DAT. The control portion 24 on the power transmitting side performs various types of processing based on the detection data DAT.

Note that, in FIG. 5, the filter portion 35 is provided between the comparator circuit 34 and the demodulation portion 36. The demodulation portion 36 determines the load modulation pattern based on the comparison result FQ after filtering processing by the filter portion 35. Although a digital filter (FIR) or the like can be used as the filter portion 35, for example, a passive filter may be used as the filter portion 35. By providing the filter portion 35, adverse effects from noise in later-described F1 and F2 in FIG. 9, for example, can be reduced.

The filter portion 35 and the demodulation portion 36 operate with receiving a drive clock signal FCK, for example. The drive clock signal FCK is a signal for defining a power transmission frequency, and the driver control circuit 22 drives the power transmission drivers DR1 and DR2 in the power transmission portion 12 with receiving the drive clock signal FCK. The primary coil L1 is driven with a frequency (power transmission frequency) defined by the drive clock signal FCK.

Figure 6:
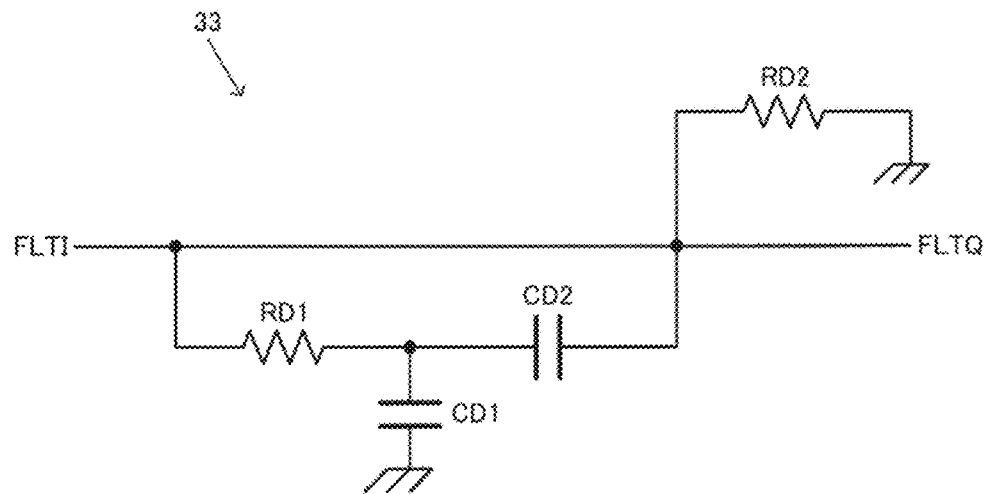
FIG. 6 illustrates an exemplary configuration of a bandpass filter portion.

An exemplary configuration of the bandpass filter portion 33 is shown in FIG. 6. In FIG. 6, FLTI is an input of the bandpass filter portion 33, and FLTQ is an output thereof. VDT in FIG. 5 corresponds to FLTI in FIG. 6, and VDTB corresponds to FLTQ.

The bandpass filter portion 33 in FIG. 6 is a RC-type passive bandpass filter constituted by a resistor and a capacitor. The bandpass filter portion 33 includes resistors RD1 and RD2 and capacitors CD1 and CD2. A low-pass filter is configured by the resistor RD1 and the capacitor CD1, and a high-pass filter is configured by the capacitor CD2 and the resistor RD2. A bandpass filter can be realized by combining the low-pass filter and the high-pass filter. That is, the level of a signal in the high-frequency band (drive frequency band, for example) is attenuated by the low-pass filter constituted by the resistor RD1 and the capacitor CD1. The level of a signal in the low-frequency band (DC band, for example) is attenuated by the high-pass filter constituted by the capacitor CD2 and the resistor RD2. Accordingly, a frequency characteristic of a high-pass filter can be realized.

Note that the configuration of the bandpass filter portion 33 is not limited to the configuration shown in FIG. 6, and various modifications can be implemented. For example, the bandpass filter portion 33 may be realized by an LC-type or LCR-type passive bandpass filter configured by an inductor, a capacitor, and the like. Alternatively, the bandpass filter portion 33 may be realized by an active bandpass filter including an operational amplifier or the like.

Figure 7:
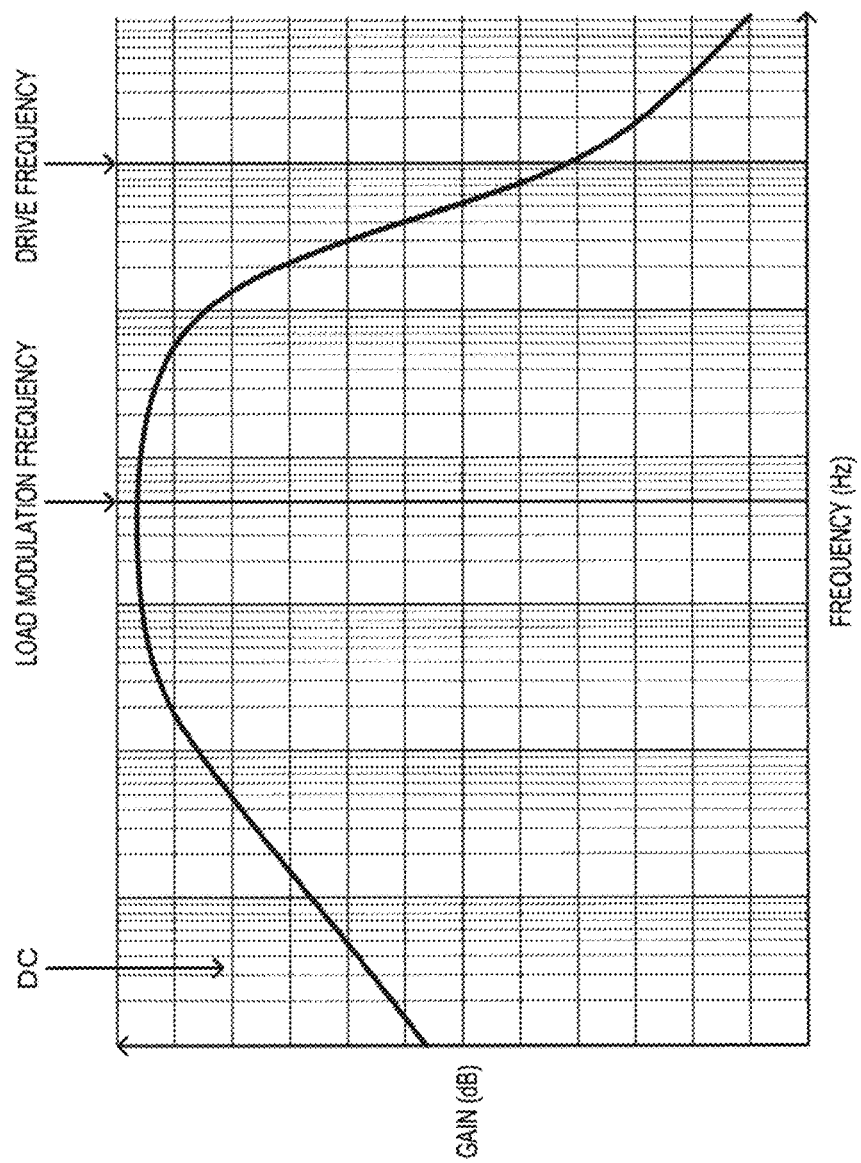
FIG. 7 shows an example of a frequency characteristic of a bandpass filter portion.

FIG. 7 shows an example of a frequency characteristic of the bandpass filter portion 33. In FIG. 7, the horizontal axis indicates the frequency and the vertical axis indicates the gain. As shown in FIG. 7, the bandpass filter portion 33 allows a signal in the frequency band of the load modulation to pass, and attenuates signals in bands other than the load modulation frequency band. Specifically, signals in a band of the drive frequency (power transmission frequency) of the power transmission portion 12 and in the DC band are attenuated, these bands being bands other than the load modulation frequency band.

Here, the load modulation frequency band is a band of frequency that is used in the load modulation in the load modulation portion 56 in FIG. 4. Specifically, the load modulation frequency band is the band of the frequency of a clock signal with which the switching element SW is turned on and off, and is a band of a modulation frequency, for example. The drive frequency band is a band including the frequency of the drive clock signal FCK, for example. For example, the driver control circuit 22 in FIG. 2 is supplied with the drive clock signal FCK from the clock generation circuit 37, and drives the power transmission drivers DR1 and DR2 in the power transmission portion 12 with the control signal (drive signal) that is generated based on the drive clock signal FCK. The band on the high frequency side in which signals are attenuated by the bandpass filter portion 33 is a band that includes the frequency of the drive clock signal FCK.

In the frequency characteristic in FIG. 7, the cut-off frequency on the high frequency side of the bandpass filter is designated as CFH and the cut-off frequency on the low frequency side is designated as CFL. In this case, the cut-off frequency CFH on the high frequency side is set to a frequency that is lower than the drive frequency. On the other hand, the cut-off frequency CFL on the low frequency side is set to a frequency that is higher than DC. In this way, the level of a signal in the drive frequency band and a signal in the DC band can be sufficiently attenuated by the bandpass filter portion 33.

Note that the bandpass filter portion 33 may be incorporated in the control device 20, or the bandpass filter portion 33 may be configured by a component external to the control device 20. For example, the resistors RD1 and RD2 and the capacitors CD1 and CD2 in FIG. 6 may be circuit elements inside the control device 20, or may be components external to the control device 20 (IC). For example, in the case where the bandpass filter portion 33 is configured by an external component, a first terminal (first pad) for FLT1 and a second terminal (second pad) for FLTQ in FIG. 6, for example, are provided in the control device 20. The detection voltage VDT signal in FIG. 5 may be output to the outside of the control device 20 via the first terminal, and the detection voltage VDTB signal after bandpass filtering processing may be input to the control device 20 from the outside via the second terminal.

In the present embodiment, as described above, the communication portion 30 detects the communication data based on the output (VDTB) of the bandpass filter portion 33 that performs bandpass filtering processing in which a signal in the load modulation frequency band is allowed to pass, and signals in the bands other than the load modulation frequency band are attenuated. Accordingly, even in the case where a large amount of noise is superimposed on the signal as in later-described FIG. 9, adverse effect from this noise can be sufficiently reduced.

That is, the power transmission portion 12 that drives the primary coil L1 with a large current and the power supply voltage control portion 14 (DC/DC converter) that performs a step-up operation of the power supply voltage by a switching regulator method, in FIG. 5, may be noise sources that generate a large amount of noise. Therefore, as shown in later-described F1 and F2 in FIG. 9, slits (glitches) occur in the comparison result due to this noise or the like, and an erroneous detection of communication data may occur. Also, because this noise is generated from the power transmission portion 12 or the power supply voltage control portion 14 as a noise source, this noise includes a large amount of drive frequency component noise.

In this regard, in the present embodiment, the communication portion 30 detects the communication data based on the output of the bandpass filter portion 33. Accordingly, the noise superimposed on the detection voltage VDT signal can be decreased. As a result, in FIG. 9, the noise superimposed on the detection voltage VDTA signal after bandpass filtering processing is reduced, and therefore the occurrence of a detection error of the communication data can be suppressed.

Specifically, as shown in a frequency characteristic in FIG. 7, the bandpass filter portion 33 attenuates signals in the drive frequency band. Accordingly, even in a case where noise having the drive frequency component is generated by the power transmission portion 12 or the power supply voltage control portion 14 as a noise source, the noise can be sufficiently decreased with the bandpass filter portion 33.

Also, as shown in the frequency characteristic in FIG. 7, the bandpass filter portion 33 attenuates a DC band signal. Accordingly, a DC component can be cut with the bandpass filter portion 33, and only an AC component signal can be output to a downstream circuit. Therefore, the downstream amplifier AP and comparator circuit 34 can handle the detection voltage signal after bandpass filtering processing as an AC signal and perform signal processing (signal amplification, comparison processing) thereon. As a result, signal processing can be performed without paying attention to a DC component signal, and preferable signal processing can be realized.

For example, as a method of comparative example of the present embodiment, a method is conceivable in which a DC level threshold voltage is set, and a DC signal level is determined to be above or below the threshold voltage when current changes. However, there is a problem in this method in that, when the base current value changes, the threshold voltage needs to be searched for and reset.

In this regard, according to the method of the present embodiment that uses the bandpass filter portion 33, a DC component can be cut and signal processing in an AC signal state can be performed, and therefore the above problem can be resolved.

The bandpass filter portion 33 allows a signal in the load modulation frequency band to pass while attenuating signal components in the drive frequency band and the DC band, in this way. Accordingly, when the power receiving side transmits communication data by load modulation, the signal component that has been subjected to the load modulation passes through the bandpass filter portion 33 and is transmitted to the downstream circuit, and therefore an appropriate detection operation for detecting communication data with the downstream comparator circuit 34 and demodulation portion 36 can be realized. Note that the bandpass filter portion 33 may be a circuit that amplifies a signal in the load modulation frequency band and allows the signal to pass, for example.

Also, in FIG. 5, the minute current ID1 that flows in the sense resistor RCS is amplified by the current detection circuit 32 and the result of the amplification is output to the bandpass filter portion 33 as the detection voltage VDT. Therefore, the bandpass filter portion 33 can perform bandpass filtering processing on the detection voltage VDT that is a result of amplification performed on the voltage that has been converted from a minute current. Accordingly, even in a passive bandpass filter as shown in FIG. 6, for example, preferable bandpass filtering processing can be realized.

That is, a passive bandpass filter has a disadvantage compared with an active bandpass filter in that gain cannot be obtained. In this regard, in FIG. 5, signal amplification is performed by the IV conversion amplifier IVC in the current detection circuit 32 that is upstream of the bandpass filter portion 33, and gain can be obtained, and as a result, a passive bandpass filter in which gain is not obtained can be adopted. Also, because the passive bandpass filter does not need an operational amplifier, power saving can be realized. Also, noise that is generated in the bandpass filter itself can be minimized, and therefore preferable bandpass filtering processing can be realized.

Also, in FIG. 5, the current detection circuit 32 detects a current that flows from the power supply (5V, for example) to the power transmission portion 12 (power supply voltage control portion 14), and outputs the detection voltage VDT, and the bandpass filter portion 33 performs bandpass filtering processing on the detection voltage VDT signal. The comparator circuit 34 compares the detection voltage VDTA after the bandpass filtering processing (detection voltage after signal amplification by the amplifier AP) with the judgement voltage VCP. Then, the communication portion 30 (demodulation portion 36) detects communication data based on the comparison result by the comparator circuit 34. For example, communication data is detected with a later-described method shown in FIGS. 10 to 12B, or the like.

According to such a configuration, the minute current ID1 (several mA, for example) that flows in the sense resistor RCS (0.1 to 0.3Ω, for example) due to load modulation on the power receiving side is converted to a voltage and the voltage is amplified, bandpass filtering processing is performed on the signal after amplification, the obtained detection voltage VDTA is compared with the judgement voltage VCP, and communication data can be detected based on the comparison result.

There is a problem in that, in the case where the coils L1 and L2 are small, the coupling degree is low, for example, when load modulation is performed on the power receiving side, the current change is very small on the power transmitting side, and the detection of the current is difficult.

In this regard, according to the configuration in FIG. 5, a minute current change due to load modulation on the power receiving side is detected, the detection voltage VDTA and the judgement voltage VCP is compared, and communication data can be detected. Therefore, even in a case where the coils L1 and L2 are small, the coupling degree is small, or the like, an adequate operation for detecting communication data can be realized.

Figure 9:
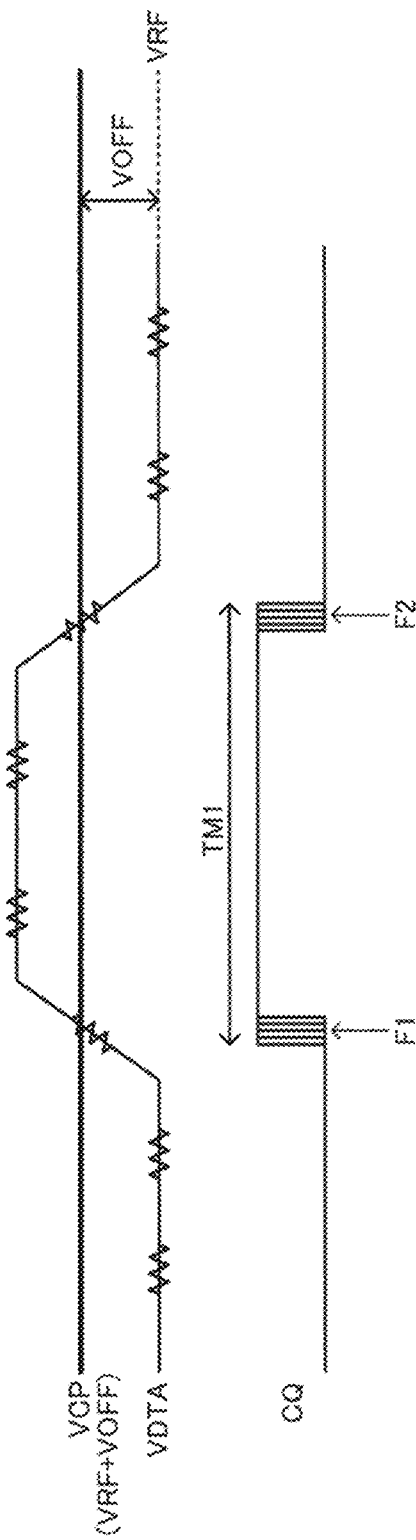
FIG. 9 is a diagram for describing a problem caused by noise in communication.

Also, since the power transmission portion 12 or the power supply voltage control portion 14 may be a noise source that generates a large amount of noise as described above, slits (glitches) occur in the comparison result due to this noise or the like, as shown in F1 and F2 in FIG. 9. The slits may not be removed by the bandpass filter portion 33.

In this regard, in FIG. 5, the filter portion 35 is provided downstream of the comparator circuit 34, and communication data is detected based on the comparison result FQ after filtering processing by the filter portion 35. Accordingly, an adverse effect of the noise (slits) at the edge change points in the detection voltage VDTA shown in F1 and F2 in FIG. 9 is not transmitted to the downstream demodulation portion 36 as a result of the filtering processing (digital filter processing) by the filter portion 35 (delay circuit), for example, and therefore an occurrence of erroneous detection of communication data or the like can be suppressed.

Also, in FIG. 5, the comparator circuit 34 compares the detection voltage VDTA with the judgement voltage VCP, and outputs the comparison result CQ. According to this configuration, the judgement voltage VCP can be set such that, while the comparison judgement result CQ changes from a low level to a high level or from a high level to a low level based on the turning on and off of the switching element SW in the load modulation portion 56, the comparison result CQ does not change due to noise that is superimposed on the detection voltage VDTA. For example, as a result of setting an optimum judgement voltage VCP depending on the current ID2 that flows in the load modulation portion 56 in FIG. 4, comparison processing by the comparator circuit 34 having strong noise immunity can be realized, and the occurrence of erroneous detection of communication data can be further suppressed.

In this case, the comparator circuit 34 is desirably a circuit in which comparison can be performed between the detection voltage VDTA and two or more judgement voltages. For example, the comparator circuit 34 is caused to compare the detection voltage VDTA with the judgement voltages VCP1=VRF+VOFF1 and VCP1=VRF+VOFF2. This is realized by using a comparator in which the offset voltages VOFF1 and VOFF2 can be set as the comparator CP that constitutes the comparator circuit 34 or the like, for example. By setting VOFF1=20 mV and VOFF2=40 mV, for example, the voltage differences between the detection voltage VDTA and the judgement voltage VCP required to determine the low level and the high level of the detection voltage VDTA in FIG. 9 can be set to 20 mV or 40 mV, for example.

When VCP=VCP1(<VCP2) is set, for example, compared with the case where VCP=VCP2 is set, more minute current change in the sense resistor RCS can be detected as the change of the comparison result CQ, and the detection sensitivity can be improved. However, when VCP=VCP1 is set, even a minute change due to noise may be erroneously detected so that the comparison judgement result CQ is changed, and the noise immunity decreases.

On the other hand, when VCP=VCP2(>VCP1) is set, compared with the case where VCP=VCP1 is set, although the detection sensitivity decreases, an advantage that the noise immunity can be improved is obtained.

As a result of adopting a circuit that can compare the detection voltage VDTA with two or more judgement voltages (VCP1, VCP2, and the like) as the comparator circuit 34, optimum comparison processing in accordance with the current value of the current ID2 that flows in the load modulation portion 56, the sizes of the coils L1 and L2, the coupling degree, noise level situation, and the like can be realized. For example, in the case where the detection sensitivity is prioritized, the judgement voltage of a lower voltage (VCP1) may be used, and in the case where the noise immunity is prioritized, the judgement voltage of a higher voltage (VCP2) may be used.

Also, in the present embodiment, as shown in FIG. 4, the load modulation portion 56 includes the current source IS, and performs load modulation using the current source IS. In this way, load modulation can be performed using the current ID2 which is a constant current independent of the magnitude of the voltage VCC (rectified voltage) at the node NVC.

There is a method for performing load modulation by providing a resistor in place of the current source IS in FIG. 4 as a method of a comparative example, for example. However, in the method of the comparative example, when the distance between the coils L1 and L2 decreases, for example, and the voltage VCC at the node NVC increases, the current ID2 that flows in the load modulation portion 56 increases. On the other hand, when the distance between the coils L1 and L2 increases and the voltage VCC at the node NVC decreases, the current ID2 that flows in the load modulation portion 56 decreases. Accordingly, the magnitude of current change on the power transmitting side due to load modulation also changes depending on the distance between the coils L1 and L2, and realization of stable communication is hindered. For example, the setting of the judgement voltage VCP (VOFF) in FIG. 9 is determined considering the detection sensitivity and the noise immunity as described above. However, if the magnitude of current change on the power transmitting side due to load modulation changes depending on the distance between the coils L1 and L2 or the like, the margin for setting the judgement voltage VCP decreases, and realization of stable communication becomes difficult In this regard, in FIG. 4, load modulation is performed using a constant current ID2 generated by the current source IS. Accordingly, even if the distance between the coils L1 and L2 or the like changes, the magnitude of current change on the power transmitting side due to load modulation does not change much. Therefore, the margin for setting the judgement voltage VCP or the like can be increased, and stable communication can be realized.

5. Detection of Communication Data with Load Modulation Pattern

In the present embodiment, a method in which communication data is detected by using a load modulation pattern is adopted. Hereinafter, details of the method for detecting communication data will be described.

Figure 8:
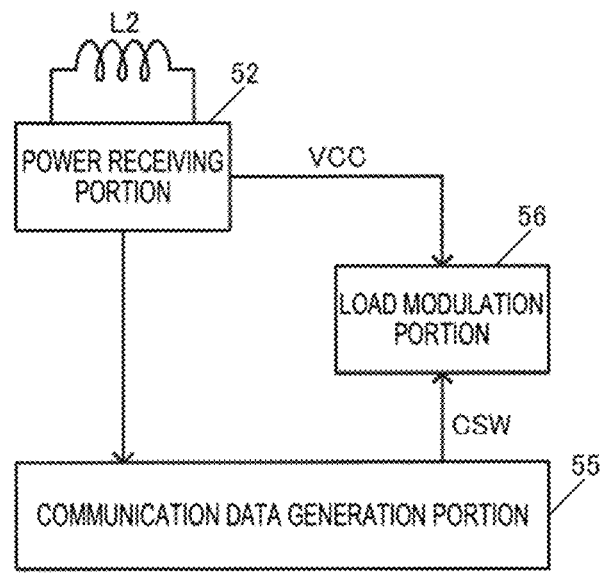
FIG. 8 is a diagram for describing a communication configuration on the power receiving side.

FIG. 8 is a diagram for describing a communication configuration on the power receiving side, for example. The power receiving portion 52 extracts a clock signal having a frequency corresponding to the drive clock signal FCK, and supplies the extracted signal to the communication data generation portion 55. The communication data generation portion 55 is provided in the control portion 54 in FIG. 2, and performs processing for generating communication data based on the supplied clock signal. The communication data generation portion 55 outputs a control signal CSW for transmitting the generated communication data to the load modulation portion 56, and causes the load modulation portion 56 to perform load modulation corresponding to the communication data by performing turning on and off the switching element SW, for example, with the control signal CSW.

The load modulation portion 56 performs load modulation by changing the load state (load due to load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise. That is, even if load modulation is performed on the power receiving side, the current ID1 that flows in the sense resistor RCS on the power transmitting side due to this load modulation becomes a very minute current. Therefore, if noise is superimposed, a data detection error occurs, and a communication error due to noise or the like occurs.

For example, FIG. 9 is a diagram schematically illustrating signal waveforms of the detection voltage VDTA, the judgement voltage VCP and the comparison judgement result CQ of the comparator circuit 30. As shown in FIG. 9, the detection voltage VDTA is a voltage signal that changes relative to the reference voltage VRF, and the judgement voltage VCP is a voltage signal in which the offset voltage VOFF (VOFF1 or VOFF2) of the comparator CP is added to the reference voltage VRF.

As shown in FIG. 9, when noise is superimposed on the detection voltage VDTA signal, for example, edge positions of the comparison result CQ signal change as illustrated in F1 and F2, and the width (interval) of a period TM1 changes so as to increase or decrease. For example, assuming that the period TM1 is a period corresponding to the logic level "1", if the width of the period TM1 changes, a sampling error of the communication data occurs, and a communication data detection error may occur. Specifically, in the case where transmitting power setting information is transmitted by regular load modulation in a normal power transmission period being performed on the power receiving side, the power transmission portion 12 that performs the normal power transmission or the like becomes a noise source, and the probability of occurrence of the communication data detection error increases.

In the present embodiment, a method is adopted in which the logic level "1" (data 1) or the logic level "0" (data 0) of each bit in the communication data is transmitted from the power receiving side using a load modulation pattern, and is detected on the power transmitting side.

Figure 10A:
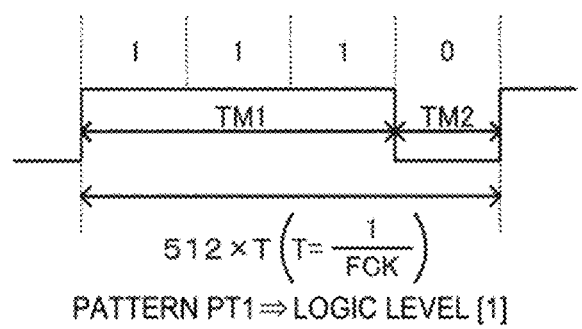
FIGS. 10A and 10B is a diagram for describing a communication method of the present embodiment.
Figure 10B:
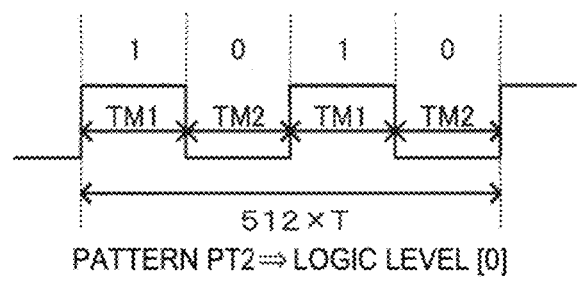

Specifically, as shown in FIGS. 10A and 10B, the load modulation portion 56 on the power receiving side performs load modulation such that the load modulation pattern is a first pattern PT1 for a first logic level "1" of the communication data that is transmitted to the power transmitting device 10. On the other hand, the load modulation portion 56 on the power receiving side performs load modulation such that the load modulation pattern is a second pattern PT2 that is different from the first pattern PT1 for a second logic level "0" of the communication data.

The communication portion 30 (demodulation portion) on the power transmitting side determines that the communication data is communication data of the first logic level "1" if the load modulation pattern is the first pattern PT1. On the other hand, the communication portion 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation portion 56 is a high load, for example. Specifically, in FIGS. 10A and 10B, a period TM1 in the first load state is a period in which the switching element SW in the load modulation portion 56 is turned on and current of the current source IS flows from the node NVC to the GND side, and is a period corresponding to a high level (bit=1) in the first and second patterns PT1 and PT2.

On the other hand, the second load state is a state where the load on the power receiving side set by the load modulation portion 56 is a low load, for example. Specifically, in FIGS. 10A and 10B, a period TM2 in the second load state is a period in which the switching element SW in the load modulation portion 56 is turned off, and is a period corresponding to a low level (bit=0) in the first and second patterns PT1 and PT2.

In FIGS. 10A and 10B, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 10A, the first pattern PT1 is a pattern corresponding to a bit pattern (1110), for example. As shown in FIG. 10B, the second pattern PT2 is a pattern corresponding to a bit pattern (1010), for example. In these bit patterns, bit=1 corresponds to a state in which the switching element SW in the load modulation portion 56 is turned on, and bit=0 corresponds to a state in which the switching element SW in the load modulation portion 56 is turned off.

For example, in the case where the bit in transmitting communication data is a logic level "1", the switching element SW in the load modulation portion 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in transmitting communication data is a logic level "0", the switching element SW in the load modulation portion 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the drive frequency in the power transmission portion 12 is FCK, and the drive cycle is T=1/FCK, the length of each of the first and second patterns PT1 and PT2 is expressed as 512×T, for example. In this case, the length of one bit section can be expressed as (512×T)(4=128×T. Accordingly, in the case where the bit in the communication data is in a logic level "1", the switching element SW in the load modulation portion 56 is turned on and off, on the power receiving side, in the bit pattern (1110) that corresponds to the first pattern PT1 in an interval 128×T, for example. Also, in the case where the bit in the communication data is in a logic level "0", the switching element SW in the load modulation portion 56 is turned on and off, on the power receiving side, in the bit pattern (1010) that corresponds to the second pattern PT2 in the interval 128×T, for example.

Note that the drive frequency FCK is approximately from 80 to 120 KHz, for example, and the frequency FMD (clock frequency in turning on and off the switching element SW) for the load modulation in the load modulation portion 56 is approximately from 300 to 500 Hz, for example. Specifically, when the drive frequency is expressed as FCK=1/T, the frequency FMD for the load modulation can be expressed as FMD=1/(256×T)=FCK/256 in FIGS. 10A and 10B.

Figure 11:
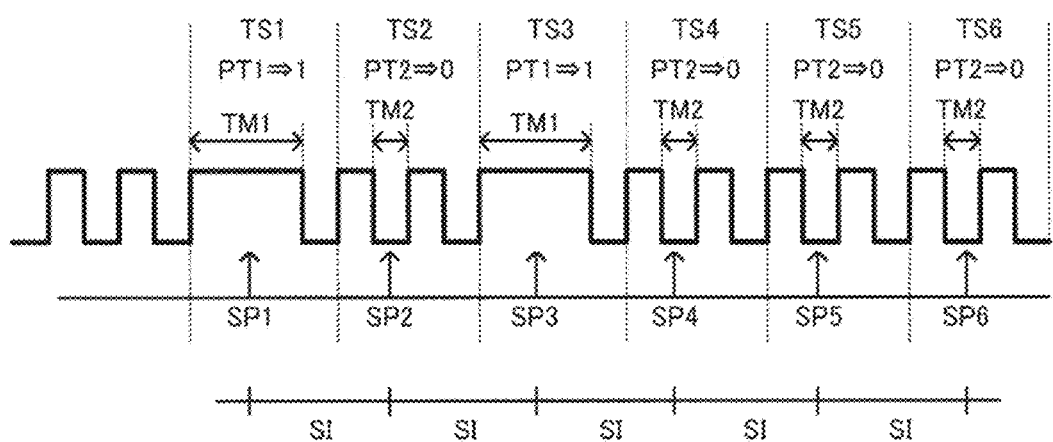
FIG. 11 is a diagram for describing the communication method of the present embodiment.

On the other hand, a detection operation and fetching processing for communication data are performed on the power transmitting side by a method shown in FIG. 11, for example. For example, the communication portion 30 (demodulation portion) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 11 are sampling points that are set at sampling intervals SI. The sampling interval SI is an interval that corresponds to the length of the load modulation pattern. That is, the sampling interval SI is an interval that corresponds to the length of each of the first and second patterns PT1 and PT2 that are load modulation patterns. For example, in FIGS. 10A and 10B, the length of each of the first and second patterns PT1 and PT2 is 512×T(=512/FCK), and therefore the length of the sampling interval SI is also 512×T.

In FIG. 11, the load modulation patterns in the periods TS1, TS2, TS3, TS4, TS5, and TS6 are respectively PT1, PT2, PT1, PT2, PT2, and PT2. Here, the periods TS1, TS2, TS3, TS4, TS5, and TS6 are periods that respectively correspond to the sampling points SP1, SP2, SP3, SP4, SP5, and SP6. Accordingly, in the case shown in FIG. 11, communication data (101000) having a number of bits=6, for example, is taken in by performing sampling on the load modulation pattern from the first sampling point SP1 at the sampling intervals SI.

Specifically, the communication portion 30 detects a pulse whose signal level is a high level, and performs bit synchronization in the case where the pulse width is less than a first range width (220×T to 511×T, for example). For example, the demodulation portion 36 detects a first edge at which a state in which the comparison judgement result CQ (FQ) signal is at a low level ("0") having a length corresponding to a predetermined number of bits changes to a high level ("1") and a second edge at which the comparison judgement result CQ (FQ) changes from a high level to a low level after the first edge. Then, in the case where the pulse width defined by the first edge and the second edge is inside the first range width (220×T to 511×T), the bit synchronization is determined to be achieved, and a logic level "1" of the first bit in the communication data is detected. Then, in the case where the bit synchronization is achieved, the first sampling point SP1 is set at the center point of the pulse width, and signals are taken in at the sampling intervals SI (512×T, for example) from the first sampling point SP1. The logic level is determined to be a logic level "1" (first pattern PT1) if the level of the signal that is taken in is a high level, and the logic level is determined to be a logic level "0" (second pattern PT2) if the level of the signal that is taken in is a low level. In this way, in FIG. 11, communication data (101000) is taken in. In actuality, by taking in data in an amount of 15 bits after the bit synchronization (after data of 1 bit is taken in in SP1), communication data of an amount of 16 bits as a whole is taken in. In this 16 bit communication data, the first 1 bit (the bit with which bit synchronization is achieved) is always "1".

In the present embodiment, as described above, in the case where the width of the period TM1 in the first load state is less than the first range width (220×T to 511×T), the first sampling point SP1 is set within the period TM1 of the first load state, as shown in FIG. 11.

Figure 12A:
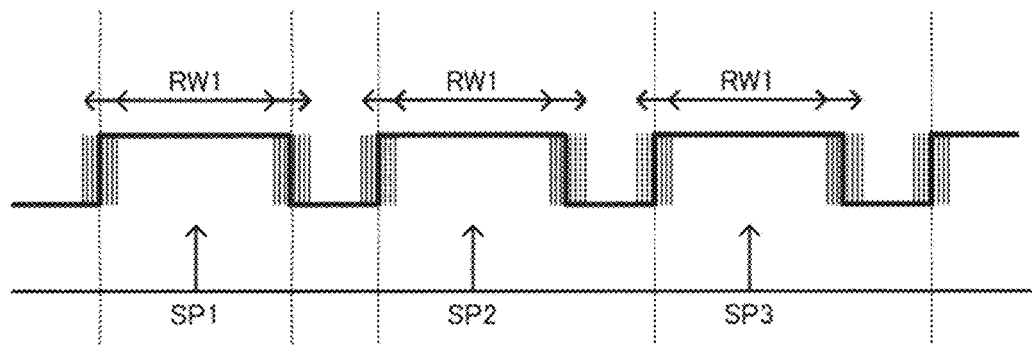
FIGS. 12A and 12B are also diagrams for describing the communication method of the present embodiment.

Specifically, in the case where the width of the period TM1 in which the signal level is at a high level is less than the first range width RW1, as shown in FIG. 12A, bit synchronization is performed, and the first sampling point SP1 is set at the center point, for example, of the period TM1. Then, sampling is performed at the sampling intervals SI from the set first sampling point SP1. Here, the first range width RW1 (220×T to 511×T) is a range width that is set corresponding to the period TM1 (384×T) in the first load state in the first pattern PT1.

That is, as described in FIG. 9, the width of the period TM1 changes due to noise or the like. A typical value of the width of the period TM1 in the first pattern PT1 is a width 128×3×T=384×T that corresponds to an amount of 3 bits (111). Accordingly, the first range width RW1 (220×T to 511×T) is set so as to include this 384×T. The period at a high level that is less than the first range width RW1 (220×T to 511×T) is determined to be the period TM1 in the first pattern PT1, and bit synchronization for setting the first sampling point SP1 is performed. In this way, even in the case where noise is superimposed on the signal, as shown in FIG. 9, an adequate first sampling point SP1 can be set by performing adequate bit synchronization.

After setting the first sampling point SP1, sampling is performed at the sampling intervals SI, and either the first or second patterns PT1 and PT2 is determined based on the signal level at each sampling point.

Specifically, the communication portion 30 determines that the load modulation pattern at the second sampling point SP2 is the first pattern PT1 in the case where the load state is the first load state (in the case where the signal level is at a high level) at the second sampling point SP2 which is next to the first sampling point SP1, as shown in FIG. 12A. That is, the communication portion 30 determines that the logic level of the bit in the communication data is "1". Also, the communication portion 30 determines that the load modulation pattern at the third sampling point SP3 is the first pattern PT1 and the logic level of the bit in the communication data is "1" in the case where the load state is the first load state (high level) at the third sampling point SP3 which is next to the second sampling point SP2, as shown in FIG. 12A. The same is applied to the sampling points thereafter.

Figure 12B:
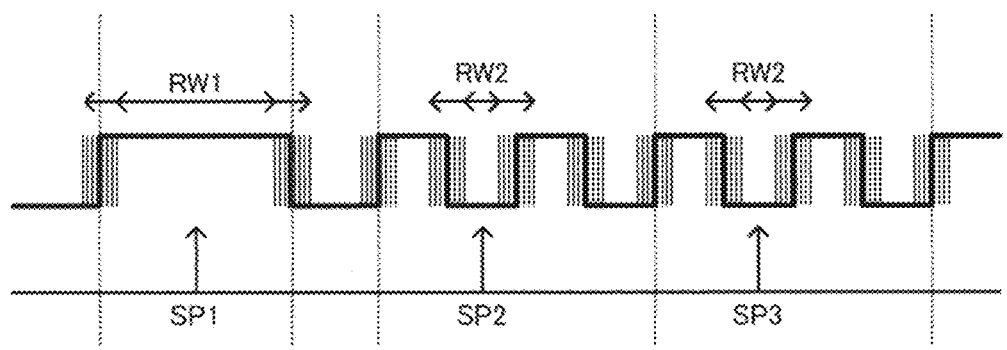

On the other hand, the communication portion 30 determines that the load modulation pattern at the second sampling point SP2 is the second pattern PT2 in the case where the load state is the second load state (in the case where the signal level is in the low level) at the second sampling point SP2, as shown in FIG. 12B. That is, the communication portion 30 determines that the logic level of the bit in the communication data is "0". Also, the communication portion 30 determines that the load modulation pattern at the third sampling point SP3 is the second pattern PT2 and the logic level of the bit in the communication data is "0" in the case where the load state is the second load state (low level) at the third sampling point SP3. The same is applied to the sampling points thereafter.

For example, in FIG. 11, the load state at the sampling point SP2 is the second load state (low level), and therefore the load modulation pattern is determined to be the second pattern PT2, and the logic level is determined to be "0". Since the load state at the sampling point SP3 is the first load state (high level), the load modulation pattern is determined to be the first pattern PT1, and the logic level is determined to be "1". Since the load states at the sampling points SP4, SP5, and SP6 are the second load state (low level), the load modulation patterns are determined to be the second pattern PT2, and the logic levels are determined to be "0".

Note that, at each sampling point in FIGS. 11 to 12B, the width of the load state period that includes the sampling point may be verified to be in a predetermined range width. That is, a condition regarding whether the pulse width is in the range width is added when the signal is taken in.

For example, as shown in FIG. 12A, in the case where, at the second sampling point SP2, the load state is the first load state (high level), and the width of the first load state period TM1 (high level pulse width) that includes the second sampling point SP2 is less than the first range width RW1 (220×T to 511×T), the load modulation pattern at the second sampling point SP2 is determined to be the first pattern PT1 (logic level "1"). Similarly, in the case where, at the third sampling point SP3, the load state is the first load state (high level) and the width of the first load state period TM1 (high level pulse width) that includes the third sampling point SP3 is less than the first range width RW1, the load modulation pattern at the third sampling point SP3 is determined to be the first pattern PT1.

On the other hand, as shown in FIG. 12B, in the case where, at the second sampling point SP2, the load state is the second load state (low level), and the width of the second load state period TM2 (low level pulse width) that includes the second sampling point SP2 is within the second range width RW2 (80×T to 150×T, for example), the load modulation pattern at the second sampling point SP2 is determined to be the second pattern PT2 (logic level "0"). Similarly, in the case where, at the third sampling point SP3, the load state is the second load state (low level) and the width of the second load state period TM2 (low level pulse width) that includes the third sampling point SP3 is within the second range width RW2, the load modulation pattern at the third sampling point SP3 is determined to be the second pattern PT2.

Here, the second range width RW2 (80×T to 150×T) is a range width that is set corresponding to the second load state period TM2 (128×T) in the second pattern PT2. Since the typical value of period TM2 is 128×T corresponding to 1 bit, the second range width RW2 (80×T to 150×T) is set so as to include the period 128×T.

For example, when the communication state is normal, a big problem will not occur even if data is detected by taking in signals at the sampling points SP2, SP3, SP4, . . . , that are set at the sampling intervals SI from the sampling point SP1, as shown in FIG. 11, without confirming the size (RW1, RW2) of pulse width (pulse width of period TM1 or TM2) at high level or low level.

However, there is a problem in that, when positional displacement occurs or vibration or the like occurs between the charger 500 and the electronic apparatus 510 in FIG. 1A, for example, during communication, for example, a communication error may occur due to current change caused by the stated phenomena. In this case, occurrence of above-described communication error can be reduced by performing later-described CRC error check. However, with only error check by CRC (8 bits, for example), the above communication error cannot be detected with a predetermined probability (1/256, for example), and a wrong determination may be made.

In this regard, as described in FIGS. 12A and 12B, if the method is adopted in which the pulse width at high level or low level is verified to be within the first or second range width RW1 or RW2 at each sampling point, the above problem can be prevented from occurring.

In the present embodiment as described above, the logic level of the communication data is judged by determining the load modulation pattern. For example, in a known technique, a method is adopted in which the first load state in which the switching element SW in the load modulation portion 56 is turned on is judged to be the logic level "1", and the second load state in which the switching element SW is turned off is the logic level "0". However, in this known method, a communication data detection error due to noise or the like may occur, as described in FIG. 9.

In contrast, in the present embodiment, the logic level of each bit in the communication data is detected by determining whether the load modulation pattern is the first or second pattern PT1 or PT2, as shown in FIGS. 10A and 10B, for example. Accordingly, even in a situation in which there is a large amount of noise, as shown in FIG. 9, proper detection of the communication data is made possible. That is, the width (pulse width) of the first load state (high level) period TM1 is very different in the first and second patterns PT1 and PT2 in FIGS. 10A and 10B, and the logic level of each bit of the communication data is detected by identifying patterns as a result of identifying the difference of the period TM1 width in the present embodiment. For example, in the first bit synchronization in FIGS. 11 to 12B, in the case where the period TM1 width is less than the first range width RW1 (220×T to 511×T), the sampling point SP1 is set at the center point of the period TM1, and signals are taken in at the sampling points SP2, SP3, SP4, . . . , thereafter. Therefore, even in a case where the period TM1 width or the like at the sampling point SP1 changes due to noise, for example, proper detection of the communication data is made possible. Also, since the sampling points SP2, SP3, SP4, . . . , thereafter can be set by simple processing based on the sampling interval SI, there is an advantage in that the processing load in the detection operation of the communication data can be reduced.

Note that the communication method of the present embodiment is not limited to the method described in FIGS. 10A to 12B, and various modifications can be implemented. For example, although the first pattern PT1 is associated with the logic level "1" and the second pattern PT2 is associated with the logic level "0" in FIGS. 10A and 10B, the association relationship may be reversed. Also, the first and second patterns PT1 and PT2 in FIGS. 10A and 10B are examples of the load modulation patterns, and the load modulation patterns of the present embodiment are not limited thereto and various modifications can be implemented. For example, although the first and second patterns PT1 and PT2 are set to have the same length in FIGS. 10A and 10B, they may be set to have different lengths. Also, in FIGS. 10A and 10B, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIGS. 10A and 10B can be adopted.

Also, in the present embodiment, the filter portion 35 is provided on an upstream side of the demodulation portion 36, as shown in FIG. 5, and lowpass digital filtering processing is performed such that data having a width less than or equal to 16×T is not transmitted to the demodulation portion 36. As a result, slits (glitches) such as those shown in F1 and F2 in FIG. 9 are handled as data having a width less than or equal to 16×T, for example, and are not transmitted to the demodulation portion 36.

An example of the communication data format used in the present embodiment is shown in FIGS. 13A and 13B.

In FIG. 13A, the communication data is constituted by 64 bits, and one packet is configured by these 64 bits. The data of the first set of 16 bits is 00h. In the case where normal power transmission (or intermittent power transmission) is started on the power transmitting side by detecting the load modulation on the power receiving side, for example, a certain amount of time is required before the current detection circuit 32 or the like in the communication portion 30 operates and the communication data can be properly detected. Therefore, 00h that is dummy (null) data is set to the first 16 bits. Various processing necessary for bit synchronization, for example, is performed on the power transmitting side in a communication period of the first 16 bits 00h.

A data code and information on the rectified voltage (VCC) are set in the second set of 16 bits. The data code is a code for specifying data that is to be transmitted by the third set of 16 bits, as shown in FIG. 13B. The rectified voltage (VCC) is used as transmitting power setting information of the power transmitting device 10. Specifically, the power supply voltage control portion 14 variably controls the power supply voltage VDRV that is supplied to the power transmission drivers DR1 and DR2 based on the rectified voltage (VCC) information or the like, and thereby variably controls the transmitting power of the power transmission portion 12.

Information such as temperature, a charge voltage, a charge current, a status flag, number of cycles, or an IC number is set to the third set of 16 bits according to the setting designated by the data code. The temperature is a battery temperature or the like, for example. The charge voltage and the charge current are the charge voltage (such as VBAT) and the charge current of the battery 90, and are information representing the charge state. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle times) is information representing the number of charging times. The IC number is a number for specifying a control device IC. CRC information is set in the fourth set of 16 bits. The CRC is information for CRC error check.

Note that, as shown in later-described FIG. 14, in the case where landing of the electronic apparatus 510 is detected and VCC becomes larger than 6.0 V, communication data of null data (dummy data) in 1 packet (64 bits) is transmitted first in the load modulation in B5. The normal power transmission is started on the power transmitting side by detecting the communication data of null data.

Also, although an example of the communication method of the present embodiment is shown in the above, the communication method of the present embodiment is not limited thereto, and various modifications can be implemented. For example, the communication method of the present embodiment is not limited to the method in which the load modulation patterns are associated with the logic levels shown in FIGS. 10 to 12B, and a method in which the first load state is associated with the logic level "1" and the second load state is associated with the logic level "0", for example, or the like may be adopted. Also, the format of the communication data and the communication processing are not limited to the method described in the present embodiment, and various modifications can be implemented.

6. Detailed Example of Operation Sequence

Figure 14:
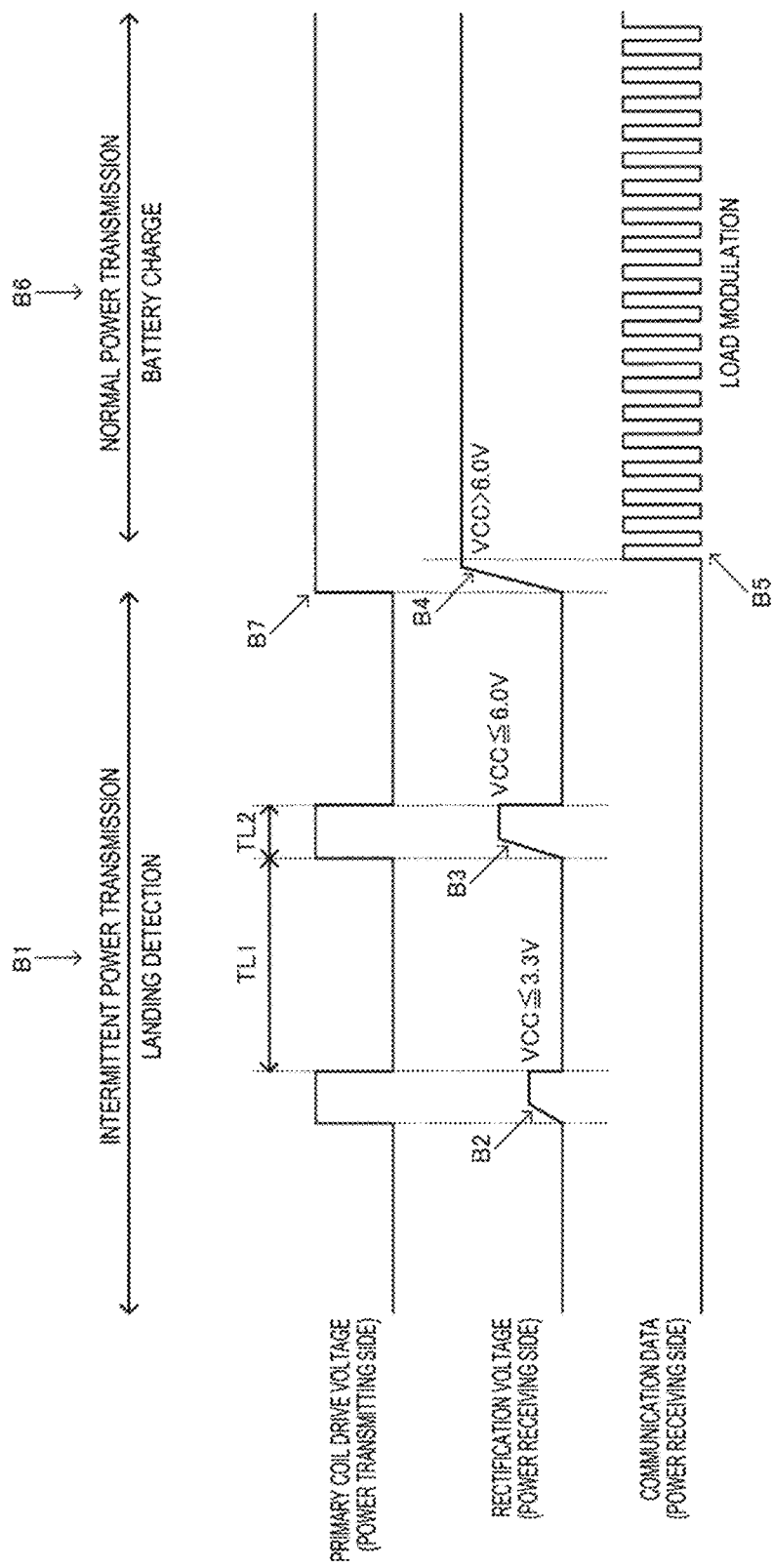
FIG. 14 is a signal waveform diagram for describing an operation sequence of the present embodiment.
Figure 15:
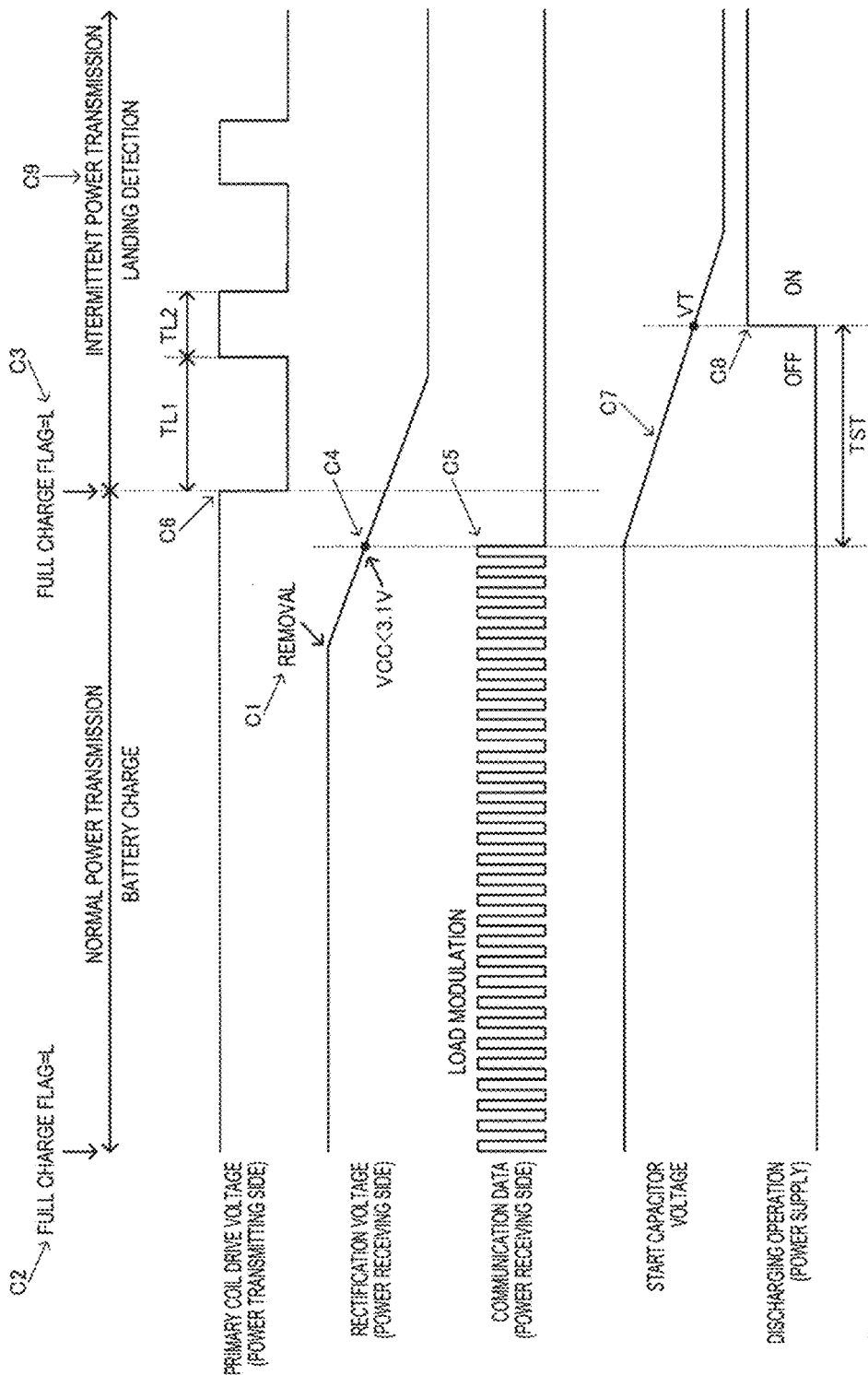
FIG. 15 is a signal waveform diagram for describing the operation sequence of the present embodiment.
Figure 16:
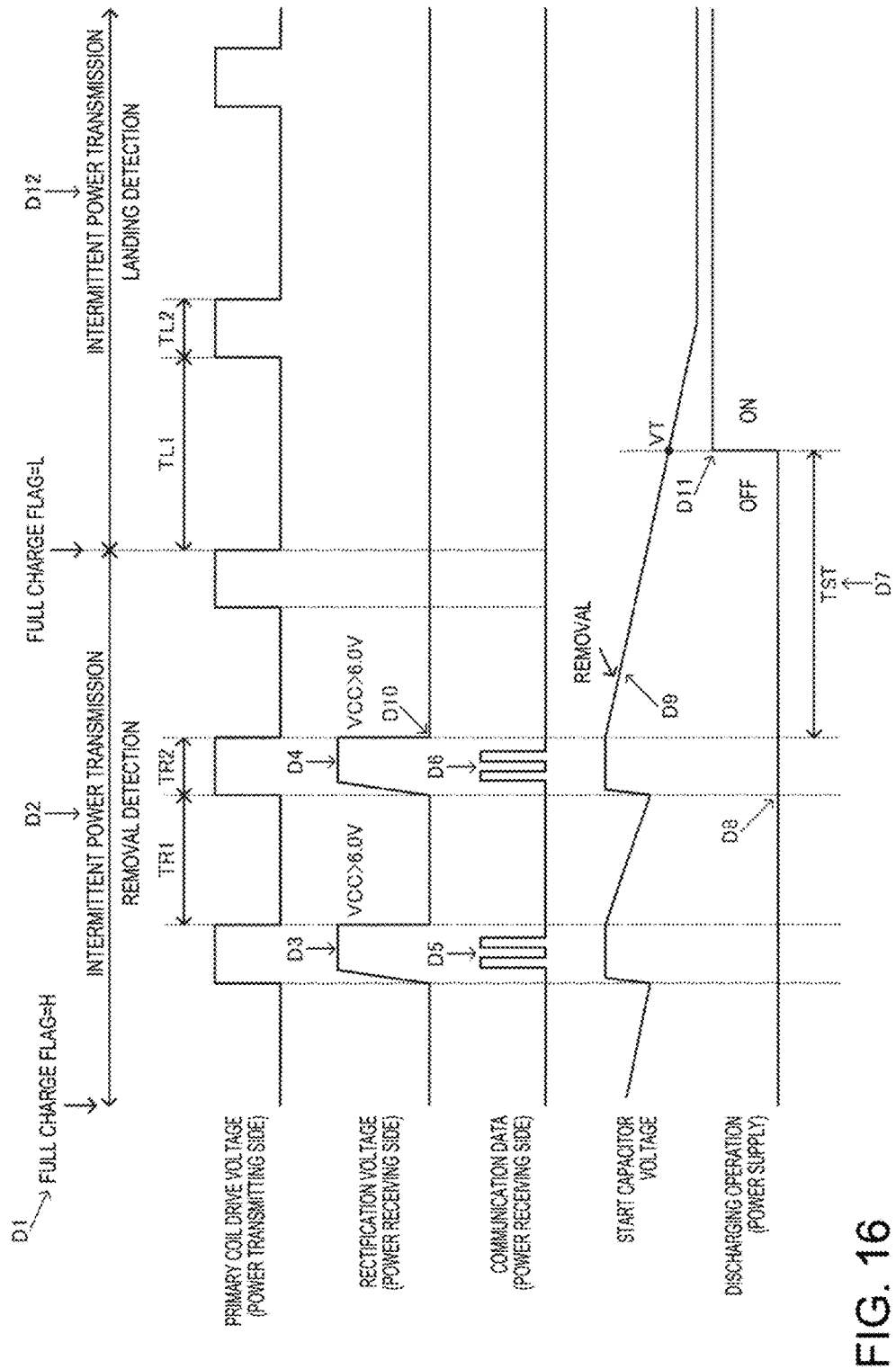
FIG. 16 is a signal waveform diagram for describing the operation sequence of the present embodiment.

FIGS. 14 to 16 are signal waveform diagrams for describing a detailed operation sequence of the contactless power transmission system of the present embodiment.

B1 in FIG. 14 is the stand-by state in A1 in FIG. 3, and intermittent power transmission for landing detection is performed. That is, power transmission of a period TL2 is performed at the intervals of a period TL1. The period of TL1 is 3 s for example, and the period of TL2 is 50 ms for example. In B2 and B3 in FIG. 14, the rectified voltage VCC that is the output voltage of the power receiving portion 52 is less than or equal to 6.0 V, and therefore, communication by load modulation is not performed.

On the other hand, in B4, the rectified voltage VCC exceeds 6.0 V that is the threshold voltage for landing detection, and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds 6.0 V, and load modulation is started. Then, when this load modulation (null communication data) is detected on the power transmitting side, normal power transmission by the power transmission portion 12 is started as shown in B6. The normal power transmission in B6 is continuous power transmission that is different from the intermittent power transmission in B1, and charging of the battery 90 by the charging portion 58 is started by the power received due to the normal power transmission. At this time, a discharging operation of the discharging portion 60 is turned off. Also, the communication data including various types of information such as the rectified voltage, the charge voltage, or the status flag is transmitted from the power receiving side to the power transmitting side by the load modulation shown in B5, and power transmission control is executed. Note that the start of the load modulation in B5 is triggered by the increase of the rectified voltage VCC due to the intermittent power transmission for landing detection shown in B7.

In C1 in FIG. 15, the electronic apparatus 510 is removed in the normal power transmission period during which charging of the battery 90 is performed. The removal in C1 is a removal before the battery 90 is fully charged, as shown in C2 and C3. That is, it is a removal in a state in which a full charge flag is at a low level that is an inactive level.

When the electronic apparatus 510 is removed in this way, the power on the power transmitting side is not transmitted to the power receiving side, and the rectified voltage VCC which is the output voltage of the power receiving portion 52 decreases. Then, when VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC (output voltage) decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Specifically, when the voltage of the start capacitor (charge voltage) decreases below a threshold voltage for turning on the discharging operation, a start-up period TST is determined to have elapsed, the discharging operation of the discharging portion 60 is turned on, and power from the battery 90 is discharged to the power supply target 100. Accordingly, the electronic apparatus 510 is in a usable state, as shown in A5 in FIG. 3. Also, the power transmission portion 12 starts to perform intermittent power transmission for landing detection, as shown in C9, after normal power transmission is stopped.

Note that, in the present embodiment, a charging system control portion and a discharging system control portion are provided as the control portion 54 on the power receiving side in FIG. 2. The charging system control portion operates by receiving a power supply voltage generated from the rectified voltage VCC (output voltage) in the power receiving portion 52. The discharging system control portion and the discharging portion 60 operate by receiving a power supply voltage generated from the charge voltage VBAT. Control or the like of the charging portion 58 and the load modulation portion 56 are performed by the charging system control portion. On the other hand, charging/discharging control of the start capacitor, control of the discharging portion 60 (on/off control of the discharging operation), and the like are performed by the discharging system control portion.

In D1 in FIG. 16, the full charge flag is at a high level which is an active level, and the full charge of the battery 90 is detected. When the full charge is detected in this way, the state is shifted to the full charge stand-by state, as shown in A3 in FIG. 3, and the intermittent power transmission for removal detection after full charge is performed, as shown in D2. That is, power transmission is performed during the period TR2 at the intervals of the period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC in the power receiving portion 52 increases above 6.0 V due to the intermittent power transmission for removal detection, as shown in D3 and D4 in FIG. 16, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC of the power receiving portion 52 decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 begins to be performed.

In the present embodiment as described above, on the condition that the power receiving device 40 has started the load modulation, as shown in B5 in FIG. 14, normal power transmission by the power transmission portion 12 is started, as shown in B6. While the load modulation in B5 continues, the normal power transmission shown in B6 continues. Specifically, as shown in C5 in FIG. 15, in the case where load modulation is not detected any more, normal power transmission by the power transmission portion 12 is stopped as shown in C6. Then, intermittent power transmission for landing detection by the power transmission portion 12 begins to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, complex authentication processing or the like can be made unnecessary, and contactless power transmission and communication by load modulation can be realized in a simple operation sequence. Also, as a result of performing communication by regular load modulation during a normal power transmission period, effective contactless power transmission according to the state of the power transmission or the like can be realized.

Also, in the present embodiment, as shown in D1 in FIG. 16, in the case where full charge of the battery 90 in the power receiving device 40 is detected based on communication data from the power receiving side, normal power transmission by the power transmission portion 12 is stopped as shown in D2, and intermittent power transmission for removal detection begins to be performed. Then, when the electronic apparatus 510 is removed and the removal is detected as shown in D9, intermittent power transmission for landing detection by the power transmission portion 12 begins to be performed, as shown in D12.

In this way, when full charge is detected, normal power transmission which is continuous power transmission is stopped, intermittent power transmission in which power is intermittently transmitted begins. Accordingly, wasteful power consumption during a removal period or the like can be suppressed, and power saving or the like can be realized.

Also, in the present embodiment, in the case where an abnormality on the power receiving side is detected based on communication data, normal power transmission by the power transmission portion 12 is stopped, and intermittent power transmission for removal detection begins to be performed. The abnormality on the power receiving side is a battery charge error such as battery fail in which the voltage of the battery 90 decreases below 1.0 V, for example, a timer end error of a charging time exceeding a predetermined period (6 to 8 hours, for example), or the like. In this way, in the case where an abnormality on the power receiving side is detected, normal power transmission which is continuous power transmission is automatically stopped, and intermittent power transmission is started, and as a result safety, reliability, or the like can be secured.

Also, in the present embodiment, as described in FIGS. 15 and 16, the power receiving device 40 discharges power from the battery 90 to the power supply target 100 after the rectified voltage VCC which is the output voltage of the power receiving portion 52 has decreased and the start-up period TST of the discharging operation has elapsed. Specifically, the discharging operation is started after the start-up period TST has elapsed after the rectified voltage VCC has decreased below the judgement voltage (3.1V). That is, as shown in C8 in FIG. 15 and D11 in FIG. 16, the discharging operation of the discharging portion 60 is turned on, and power from the battery 90 begins to be supplied to power supply target 100. Also, in the present embodiment, as shown in D2 and D7 in FIG. 16, intermittent power transmission for removal detection is performed at the intervals of period TR1 (1.5 s, for example) that is shorter than the start-up period TST (3 s, for example).

In this way, the start-up period TST does not elapse during the period TR1 for removal detection, and therefore the discharging operation of the discharging portion 60 is not turned on during intermittent power transmission period for removal detection. When the electronic apparatus 510 is removed, as shown in D9 in FIG. 16, the rectified voltage VCC no longer regularly rises as in an intermittent power transmission period for removal detection, and the discharging operation of the discharging portion 60 is turned on, as shown in D11, as a result of the start-up period TST having elapsed as shown in D7. Accordingly, the discharging operation of the discharging portion 60 is automatically turned on as a result of detecting removal of the electronic apparatus 510, and power from the battery 90 can by supplied to the power supply target 100.

7. Power Control

In the present embodiment, a method is adopted in which power transmission control on the power transmitting side is performed based on communication data from the power receiving side. Specifically, the power transmission portion 12 includes the power supply voltage control portion 14 that controls the power transmission drivers DR1 and DR2 and the power supply voltage VDRV of the power transmission drivers DR1 and DR2 in FIG. 2. The control portion 24 controls the power supply voltage control portion 14 based on the communication data from the power receiving device 40 (control device 50).

Specifically, the control portion 24 causes the power supply voltage control portion 14 to supply the power supply voltage VDRV that variably changes based on the transmitting power setting information included in the communication data, to the power transmission drivers DR1 and DR2 in the period of the normal power transmission. Accordingly, the transmitting power of the power transmission portion 12 can be variably controlled based on the transmitting power setting information.

On the other hand, the control portion 24 causes the power supply voltage control portion 14 to supply the power supply voltage VDRV for landing detection and for removal detection to the power transmission drivers DR1 and DR2 in the period of intermittent power transmission for landing detection and for removal detection.

Here, the power supply voltage for landing detection and for removal detection is a voltage corresponding to the high potential side voltage level in the signal waveforms of the primary coil drive voltage in FIGS. 14 to 16. The power supply voltage for landing detection and the power supply voltage for removal detection may be the same voltage, or may be different voltages. For example, the power supply voltage for removal detection may be set to a higher voltage than the power supply voltage for landing detection. By setting the power supply voltage for removal detection to a high voltage, it is possible to suppress the occurrence of a situation in which, in FIG. 3, removal of the electronic apparatus 510 is erroneously detected when the electronic apparatus 510 is not removed in actuality.

Figure 17A:
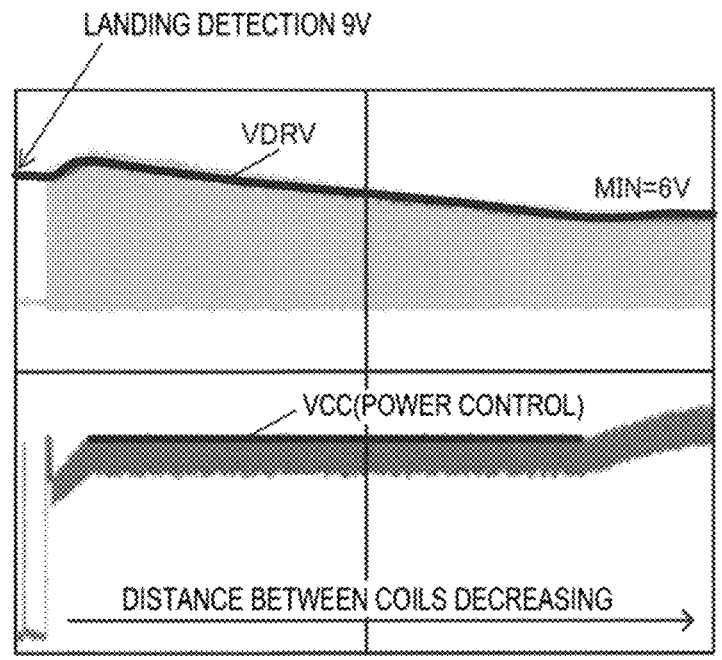
FIGS. 17A and 17B are diagrams for describing a power control method of the present embodiment.
Figure 17B:
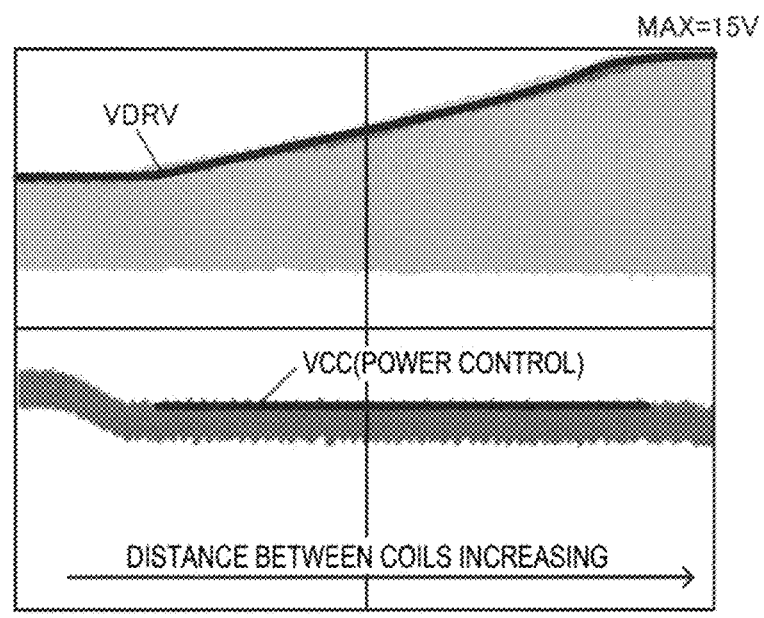

FIGS. 17A and 17B are diagrams for describing a method for controlling transmitting power based on the transmitting power setting information (such as rectified voltage VCC).

FIG. 17A shows an example in which the distance between the coils L1 and L2 is reduced. In this case, control is performed such that, after landing detection is performed at the power supply voltage VDRV of 9V, the power supply voltage VDRV is lowered slowly as the distance between the coils decreases. That is, the power supply voltage control portion 14 performs control such that, under the control of the control portion 24, the power supply voltage VDRV that is supplied to the power transmission drivers DR1 and DR2 is lowered. That is, the power supply voltage VDRV is controlled such that the rectified voltage VCC, which is an output voltage of the power receiving portion 52, is to be constant. Accordingly, in the case where the distance between the coils L1 and L2 is reduced as well, power control is performed such that the received power of the power receiving device 40 is to be constant, and optimum and stable power control can be realized.

FIG. 17B shows an example in which the distance between the coils L1 and L2 is increased. In this case, control is performed such that the power supply voltage VDRV is increased slowly as the distance between the coils increases. That is, the power supply voltage control portion 14 performs control such that, under the control of the control portion 24, the power supply voltage VDRV that is supplied to the power transmission drivers DR1 and DR2 is increased. That is, the power supply voltage VDRV is controlled such that the rectified voltage VCC, which is an output voltage of the power receiving portion 52, is to be constant. Accordingly, in the case where the distance between the coils L1 and L2 is increased as well, power control is performed such that the received power of the power receiving device 40 is to be constant, and optimum and stable power control can be realized.

Figure 18A:
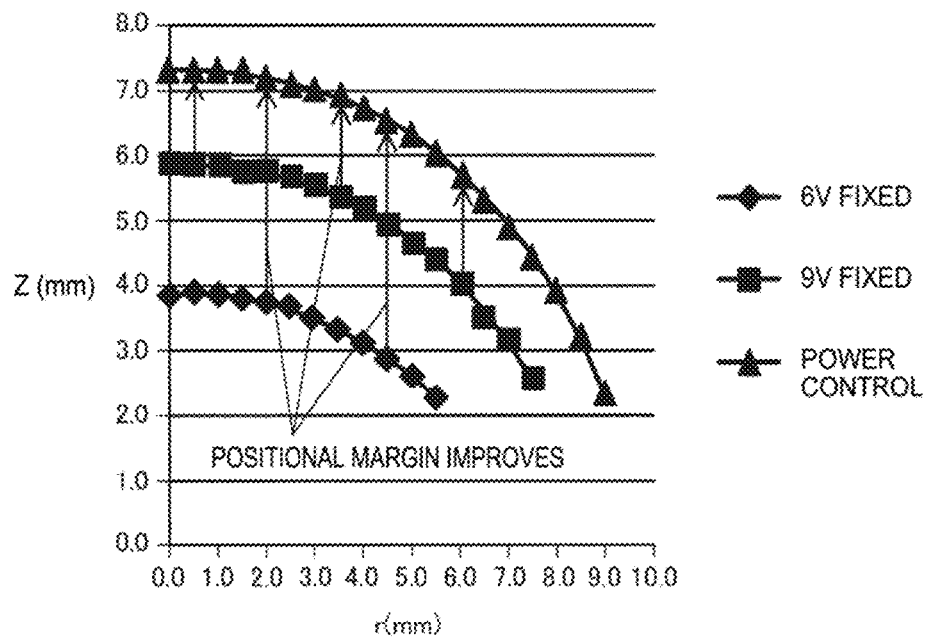
FIGS. 18A and 18B are diagrams for describing an effect when the power control method of the present embodiment is used.
Figure 18B:
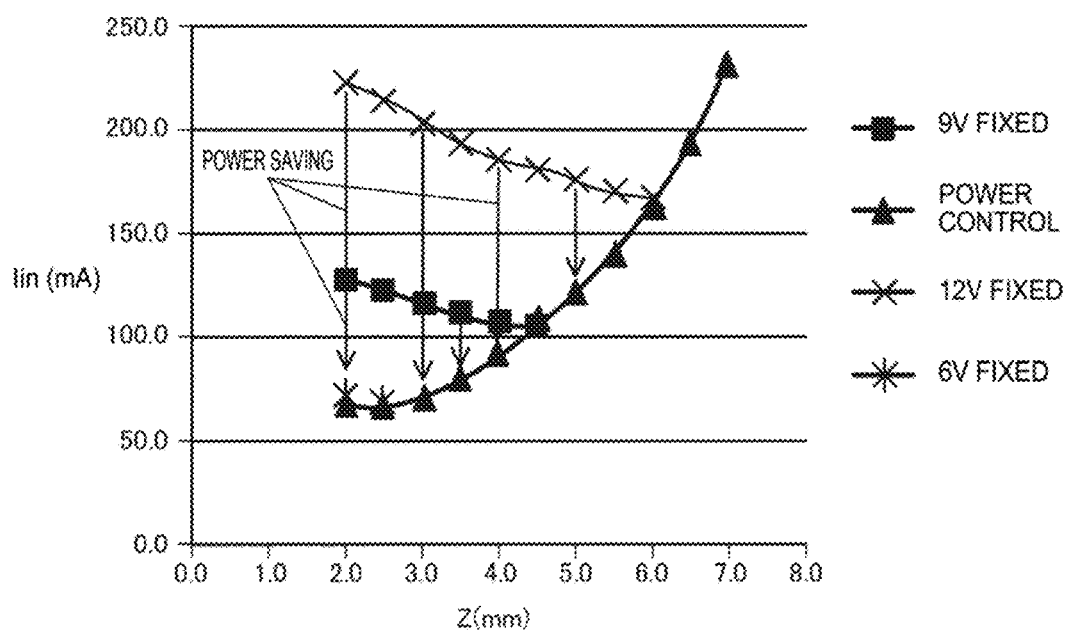

FIGS. 18A and 18B are diagrams for describing effects of the power control of the present embodiment. In FIG. 18A, Z represents a distance in a Z axis which is an axis along a height direction in the coils L1 and L2 shown in FIG. 1B. r represents the size of a positional displacement in a XY plane that is orthogonal to the Z axis (positional displacement in a radial direction from a coil center). As shown in FIG. 18A, according to the method of the present embodiment in which the power supply voltage is variably controlled based on the transmitting power setting information, the positional margin can be improved compared with the case where a fixed power supply voltage such as 6V or 9V is used.

Also, in FIG. 18B, Iin represents consumed current that flows from the power supply to a device on the power receiving side (such as the power transmission portion 12 or the control device 20). As shown in FIG. 18B, according to the method of the present embodiment in which the power supply voltage is variably controlled based on the transmitting power setting information, power saving can be realized compared with the method in which the power supply voltage is fixed to 6V, 9V, or 12V.

8. Power Receiving Portion and Charging Portion

Figure 19:
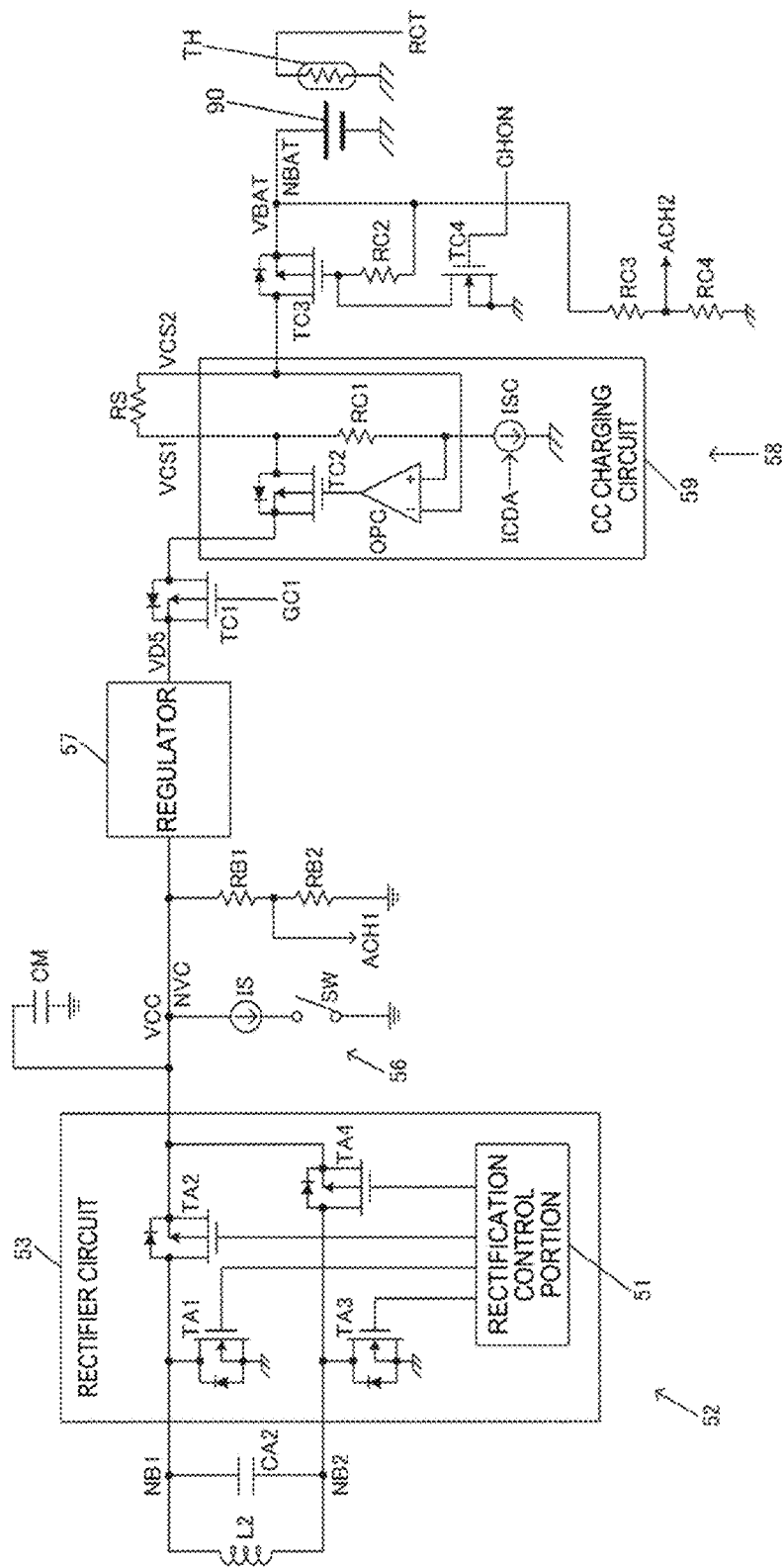
FIG. 19 illustrates detailed exemplary configurations of a power receiving portion and a charging portion.

A detailed exemplary configuration of the power receiving portion 52, the charging portion 58, and the like is shown in FIG. 19. The rectifier circuit 53 in the power receiving portion 52 includes transistors TA1, TA2, TA3, and TA4 for rectification and a rectification control portion 51 for controlling these transistors TA1 to TA4, as shown in FIG. 19.

The transistor TA1 is provided between a node NB1 which is one end of the secondary coil L2 and a GND (low potential side power supply voltage) node. The transistor TA2 is provided between the node NB1 and a node NVC of the rectified voltage VCC. The transistor TA3 is provided between a node NB2 which is the other end of the secondary coil L2 and the GND node. The transistor TA4 is provided between the node NB2 and the node NVC. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node.

A voltage ACH1 that is generated by voltage-dividing the rectified voltage VCC with the resistors RB1 and RB2 is input to the A/D converter circuit 65 in FIG. 2, for example. Accordingly, monitoring of the rectified voltage VCC is made possible, and power control or the like based on the information of the rectified voltage VCC can be realized.

The regulator 57 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the charge voltage VBAT exceeding a predetermined voltage (4.25 V, for example) is detected. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. The transistor TC2 is controlled based on the output signal of the operational amplifier OPC. A non-inverting input terminal of the operational amplifier OPC is connected to one end of the resistor RC1. The other end of the resistor RC1 is connected to one end of a sense resistor RS that is provided as a component external to the control device 50. The other end of the sense resistor RS is connected to an inverting input terminal of the operational amplifier OPC. The current source ISC is provided between the non-inverting input terminal of the operational amplifier OPC and the GND node. The current that flows in the current source ISC is controlled based on a signal ICDA.

By virtual short of the operational amplifier OPC, the transistor TC2 is controlled such that the voltage on the one end of the resistor RC1 (non-inverting input terminal voltage) is equal to the voltage VCS2 on the other end of the sense resistor RS (inverting input terminal voltage). The current that flows in the current source ISC by the control of the signal ICDA is represented as IDA, and the current that flows in the resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A signal CHON is activated when charging is performed. Accordingly, the transistors TC3 and TC4 are turned on, and charging to the battery 90 starts. Also, reverse flow from the battery 90 is prevented by a resistor RC2 provided between a gate of the transistor TC3 and a node NBAT of the charge voltage VBAT or the like. Resistors RC3 and RC4 are provided in series between the node NBAT and the GND node, and a voltage ACH2 that is generated by voltage-dividing the charge voltage VBAT with the resistors RC3 and RC4 is input to the A/D converter circuit 65. Accordingly, monitoring of the charge voltage VBAT is made possible, and various types of control can be realized based on the charge state of the battery 90.

Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the power transmitting side control device, the receiving side control device, the power transmitting device, the power receiving device are not limited to those described in this embodiment either, and various modifications can be implemented.

This application claims priority from Japanese Patent Application No. 2015-098043 filed in the Japanese Patent Office on May 13, 2015 the entire disclosure of which is hereby incorporated by reference in its entirely.

What is claimed is:

1. A control device for controlling a power transmitting device, the control device comprising:
    a driver control circuit that controls a power transmission driver in a power transmission portion that transmits power to a power receiving device;
    a control portion that controls the driver control circuit; and
    a communication portion that performs communication processing with the power receiving device that transmits communication data by load modulation, wherein
    the communication portion detects the communication data from the power receiving device based on an output of a bandpass filter portion that performs bandpass filtering processing in which a signal in a load modulation frequency band is allowed to pass and a signal in a band other than the load modulation frequency band is attenuated, and
    the communication portion includes a current detection circuit that detects a current that flows from a power supply to the power transmission portion, the current changing in response to a change in a load state on the power receiving device.

2. The control device according to claim 1, wherein the bandpass filter portion performs the bandpass filtering processing in which a signal in at least one of a drive frequency band of the power transmission portion and a DC band is attenuated.

3. The control device according to claim 1, wherein the communication portion outputs a detection voltage to the bandpass filter portion.

4. The control device according to claim 3,
    wherein the communication portion
        includes a comparator circuit that compares the detection voltage that has been subjected to the bandpass filtering processing by the bandpass filter portion with a judgement voltage, and
        detects the communication data based on a comparison result of the comparator circuit.

5. The control device according to claim 4, wherein the comparator circuit is a circuit that can compare the detection voltage that has been subjected to the bandpass filtering processing by the bandpass filter portion with two or more judgement voltages.

6. The control device according to claim 4, further comprising a filter portion provided downstream of the comparator circuit, wherein the communication portion detects the communication data based on the comparison result that has been subjected to filtering processing by the filter portion.

7. The control device according to claim 1, wherein
the power transmission portion includes a power transmission driver and a power supply voltage control portion that controls a power supply voltage of the power transmission driver, and
the control portion controls the power supply voltage control portion based on the communication data from the power receiving device.

8. The control device according to claim 7, wherein
the current detected by the current detection circuit flows from the power supply to the power transmission portion via the power supply voltage control portion, and
the current detection circuit outputs a detection voltage to the bandpass filter portion.

9. The control device according to claim 1, wherein
the communication portion determines that the communication data is in a first logic level in a case where a load modulation pattern that is constituted by a first load state and a second load state is a first pattern, and determines that the communication data is in a second logic level in a case where the load modulation pattern is a second pattern that is different from the first pattern.

10. The control device according to claim 9, wherein
the first pattern is a pattern in which a period width of the first load state is longer than that in the second pattern.

11. The control device according to claim 9, wherein
the communication portion takes in the communication data having a given number of bits by performing sampling on a load modulation pattern at given sampling intervals from a first sampling point that is set within a period of the first load state in the first pattern.

12. The control device according to claim 9, wherein
the communication portion sets the first sampling point within a period of the first load state in a case where a period width of the first load state is less than a first range width.

13. An electronic apparatus comprising the control device according to claim 1.

14. A contactless power transmission system comprising:
a power transmitting device; and
a power receiving device wherein
the power transmitting device transmits power to the power receiving device, and performs communication processing with the power receiving device that transmits communication data by load modulation,
the power receiving device receives power from the power transmitting device, and transmits the communication data to the power transmitting device by performing the load modulation,
the power transmitting device detects the communication data from the power receiving device based on an output of a bandpass filter portion that performs bandpass filtering processing in which a signal in a load modulation frequency band is allowed to pass and a signal in a band other than the load modulation frequency band is attenuated, and
the power transmitting device includes a current detection circuit that detects a current that flows from a power supply to a power transmission portion of the power transmitting device, the current changing in response to a change in a load state on the power receiving device.

15. A control device for controlling a power transmitting device, the control device comprising:
a driver control circuit that controls a power transmission driver in a power transmission portion that transmits power to a power receiving device; and
a communication portion that detects communication data from the power receiving device that transmits the communication data by load modulation as load modulation frequency, wherein
the communication portion detects the communication data based on an output of a filter portion that allows to pass a signal in the load modulation frequency and attenuates a signal in a band other than the load modulation frequency, and
the communication portion includes a current detection circuit that detects a current that flows from a power supply to the power transmission portion, the current changing in response to a change in a load state on the power receiving device.

* * * * *